US011159599B2

(12) United States Patent
Greifeneder et al.

(10) Patent No.: US 11,159,599 B2
(45) Date of Patent: Oct. 26, 2021

(54) METHOD AND SYSTEM FOR REAL-TIME MODELING OF COMMUNICATION, VIRTUALIZATION AND TRANSACTION EXECUTION RELATED TOPOLOGICAL ASPECTS OF MONITORED SOFTWARE APPLICATIONS AND HARDWARE ENTITIES

(71) Applicant: Dynatrace LLC, Detroit, MI (US)

(72) Inventors: Bernd Greifeneder, Linz (AT); Ernst Ambichl, Altenberg (AT); Andreas Lehofer, St. Florian (AT); Gunther Schwarzbauer, Linz (AT); Helmut Spiegl, Linz (AT); Rafał Młotowski, Gdansk (PL)

(73) Assignee: Dynatrace LLC, Waltham, MA (US)

( * ) Notice: Subject to any disclaimer, the term of this patent is extended or adjusted under 35 U.S.C. 154(b) by 1635 days.

(21) Appl. No.: 14/879,183

(22) Filed: Oct. 9, 2015

(65) Prior Publication Data

US 2016/0105350 A1  Apr. 14, 2016

Related U.S. Application Data

(60) Provisional application No. 62/062,220, filed on Oct. 10, 2014.

(51) Int. Cl.
*H04L 29/08* (2006.01)
*H04L 12/24* (2006.01)

(52) U.S. Cl.
CPC ............ *H04L 67/02* (2013.01); *H04L 41/046* (2013.01); *H04L 41/12* (2013.01);
(Continued)

(58) Field of Classification Search
CPC ....................................................... H04L 67/02
(Continued)

(56) References Cited

U.S. PATENT DOCUMENTS 8,234,631 B2 * 7/2012 Greifeneder ........ G06F 11/3495
717/128
10,333,820 B1 * 6/2019 Wang ...................... H04L 41/12
(Continued)

OTHER PUBLICATIONS

U.S. Appl. No. 62/218,136, filed Sep. 14, 2015, Helmut Spiegl et al.
(Continued)

*Primary Examiner* — Kevin T Bates
*Assistant Examiner* — Emad Siddiqi
(74) *Attorney, Agent, or Firm* — Harness, Dickey & Pierce, P.L.C.

(57) ABSTRACT

A system and method for real-time discovery and monitoring of multidimensional topology models describing structural aspects of applications and of computing infrastructure used to execute those applications is disclosed. Different types of agents are deployed to the monitored application execution infrastructure dedicated to capture specific topological aspects of the monitored system. Virtualization agents detect and monitor the virtualization structure of virtualized hardware used in the execution infrastructure, operating system agents deployed to individual operating systems monitor resource utilization, performance and communication of processes executed by the operating system and transaction agents deployed to processes participating in the execution of transactions, providing end-to-end transaction trace and monitoring data describing individual transaction executions. The monitoring and tracing data of the deployed agents contains correlation data that allows to create a topology model of the monitored system that integrates transaction execution, process execution and communication and virtualization related aspects.

32 Claims, 20 Drawing Sheets

(52) U.S. Cl.
CPC ...... *H04L 41/5058* (2013.01); *H04L 67/1002* (2013.01); *H04L 67/325* (2013.01)

(58) Field of Classification Search
USPC ........................................................ 709/224
See application file for complete search history.

(56) References Cited

U.S. PATENT DOCUMENTS

| | | | |
|---|---|---|---|
| 2009/0172012 A1* | 7/2009 | Chellam | G06Q 10/06 |
| 2012/0304172 A1* | 11/2012 | Greifeneder | G06F 11/3419 |
| | | | 718/1 |
| 2013/0185643 A1* | 7/2013 | Greifeneder | H04L 67/22 |
| | | | 715/736 |
| 2014/0136693 A1* | 5/2014 | Greifeneder | H04L 61/1505 |
| | | | 709/224 |
| 2014/0372630 A1* | 12/2014 | Bostick | G06F 3/0659 |
| | | | 710/5 |
| 2015/0052441 A1* | 2/2015 | Degioanni | G06F 3/0481 |
| | | | 715/734 |
| 2016/0283345 A1* | 9/2016 | Gounares | G06F 17/00 |

OTHER PUBLICATIONS

U.S. Appl. No. 14/338,637, filed Jul. 23, 2014, Bernd Greifeneder et al.

* cited by examiner

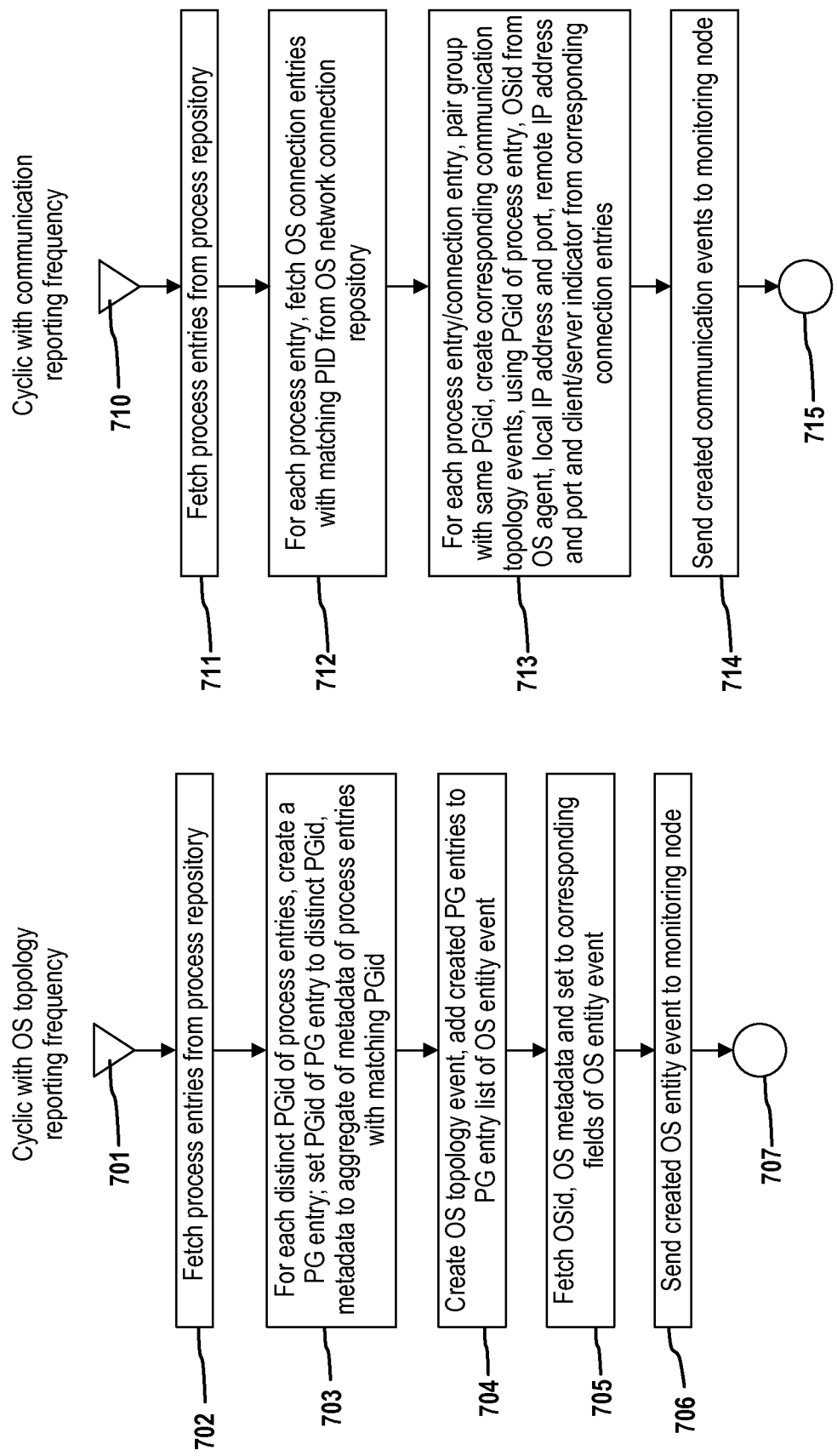

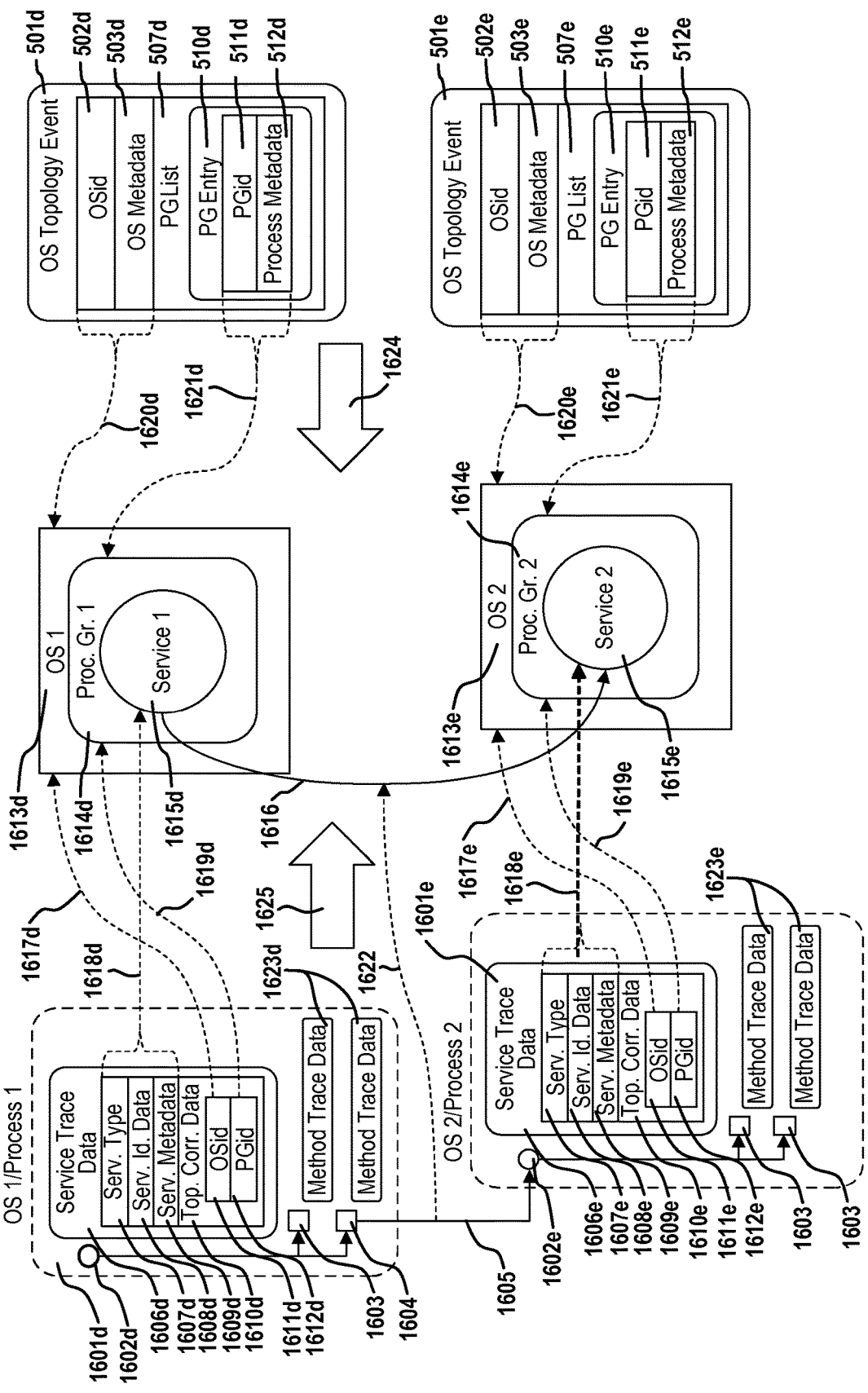

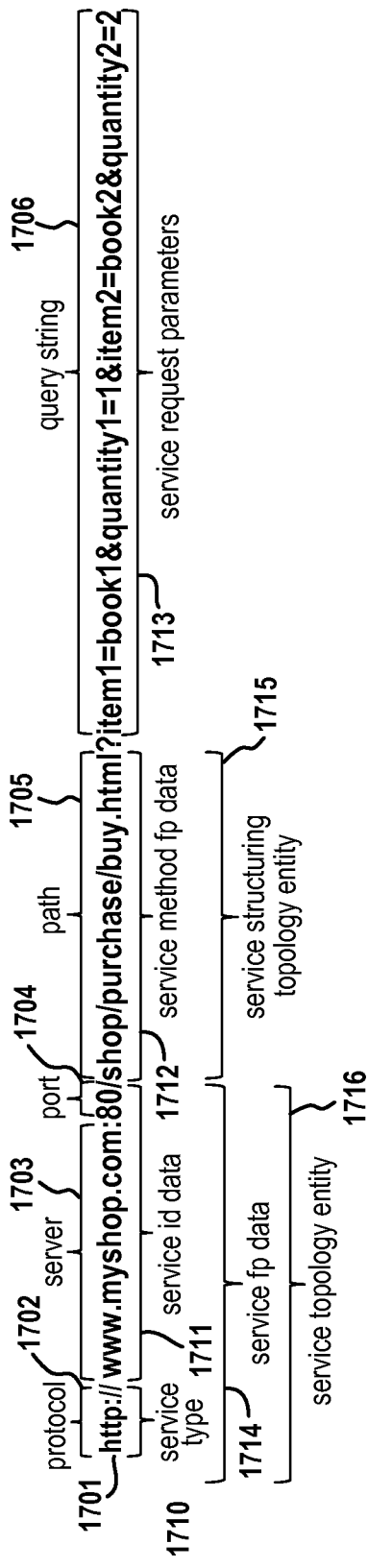
FIG. 17A    Exemplary Service Request
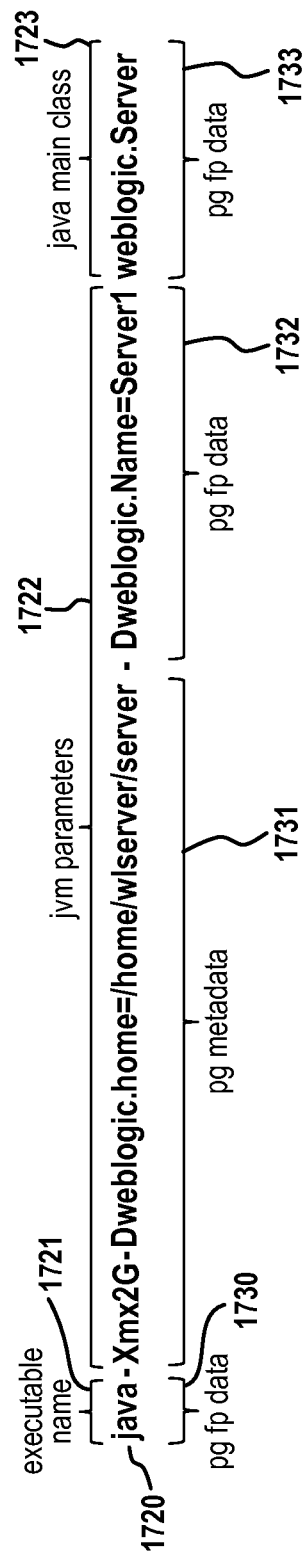
FIG. 17B    Exemplary Process Command Line

METHOD AND SYSTEM FOR REAL-TIME MODELING OF COMMUNICATION, VIRTUALIZATION AND TRANSACTION EXECUTION RELATED TOPOLOGICAL ASPECTS OF MONITORED SOFTWARE APPLICATIONS AND HARDWARE ENTITIES

CROSS-REFERENCE TO RELATED APPLICATIONS

This application claims the benefit of U.S. Provisional Application No. 62/062,220, filed on Oct. 10, 2014; the entire disclosure of this application is incorporated in its entirety herein by reference.

FIELD

The present disclosure relates to the real-time discovery and monitoring of the topology of hardware and software components participating in the execution of software applications, including virtualization, process execution and transaction related aspects of the topology.

BACKGROUND

Modern, large-scale and high transaction volume web based applications like e.g. e-commerce applications are built according to the service oriented architecture (SOA) paradigm. Such applications are formed by a loosely coupled network of communicating services. Each service provides a fraction of the desired application functionality via a defined interface. Services may be reused for different applications. As an example, a user identification service, receiving a user name and a password and returning a token notifying whether user name and password match, may be used as building block for various applications. Services are typically provided by individual processes using standardized communication protocols or interfaces like HTTP or RMI to access the services.

Virtualization techniques allow it to run multiple instances of operating systems simultaneously and isolated from each other on one physical computer system. Running multiple operating systems on the same physical hardware reduces the required physical space in the data centers and uses the hardware resources of the computer systems like CPU, memory, disk storage or network interfaces in a shared and more efficient way. Virtualization is achieved by running a dedicated virtualization software called hypervisor on the physical guest computer system. The hypervisor hosts a set of simultaneously running operating systems and distributes hardware resources like CPU cycles, or main memory to its host operating systems to achieve optimal operating conditions for all hosted operating systems. Hypervisors and the operating system instances hosted by those hypervisors are typically controlled by control instances called virtualization manager. Such virtualization managers allow remote startup and shutdown of hypervisors and individual hosted operating systems and the migration of virtualized operating systems between hypervisors.

In addition to service providing processes involved in the execution of application functionality e.g. in form of distributed transactions, background processes are executed in the data center to perform maintenance tasks like e.g. processes that backup data or batch processes. Those processes run on the same operating systems as the service providing processes and compete for the same, potentially virtualized hardware resources.

The benefits of virtualization and service orientation are essential for efficient operating and maintenance of e-commerce applications. However, they introduce functional dependencies between different applications caused e.g. by shared service process and resource utilization dependencies between different operating systems hosted by the same hypervisor.

Those dependencies can have great influence on the performance of the applications operated by the data center, but they are difficult to identify because they are documented or visualized by different tools. As an example, a virtualization management tool may provide information which hypervisors run which virtual machines, but other tools may provide information which processes are run by the operating systems executed on the virtual machines. Yet other tools or documents may provide information about which applications use which services provided by processes running on specific operating systems executing on virtual or physical machines.

This situation where information regarding interdependencies between different applications or service processes is fragmented and distributed makes it extremely difficult to calculate or anticipate the impact of planned deployment or functionality changes, like moving a virtual machine form one hypervisor to the other or optimizing a specific service process for the needs of a specific application on all affected applications. Often it is even difficult to define the set of application that are potentially affected by such a change.

Consequently, a model that describes transactional and virtualization caused interdependencies between processes and operation systems involved in the execution of applications is required. The desired model should also represent processes not involved in application execution but performing background and maintenance tasks. The model should be provided by a monitoring system that detects changes of the deployment of processes and operating systems and changes of virtualization or transactional interdependencies in real-time and also updates the model in real-time. The model should depict all applications run by the monitored data center and should also show all influencing factors form the virtualization, service reuse and background processing perspective that can have an impact on the performance of the applications run by the monitored data center.

This section provides background information related to the present disclosure which is not necessarily prior art.

SUMMARY

This section provides a general summary of the disclosure, and is not a comprehensive disclosure of its full scope or all of its features.

The disclosed monitoring technology is directed to discover, process and visualize topological aspects of computing environment dedicated to host and execute complex software applications and to create a topological model of the monitored computing infrastructure. The topological model is updated after topology relevant changes of the monitored computing environment or the monitored software applications in real-time. The topology model contains and integrates virtualization, operating system, process execution, service interaction and transaction processing aspects of the monitored computing infrastructure and applications. Typically, the disclosed monitoring technology is deployed to the computing infrastructure of a data center and provides a topological model of the whole data center and all its hosted applications. However the same monitoring technology may be used to monitor multiple data centers simultaneously or to only monitor a fraction of a data center.

Some embodiments of the disclosed technology deploy different types of agents to specific entities of the monitored computing environment. Each agent type may be capable to monitor and report a specific topological aspect of the monitored computing environment. Together with aspect specific topology monitoring data, each agent type may provide correlation data that allows to correlate the aspect specific topology data with topology data describing another aspect of the topology provided by another type of agent. As an example, a virtualization agent may provide virtualization related topology data, like e.g. data defining which virtualized computer system runs on which hypervisor. An operating system agent may provide operation system related topology data, like information about type and version of the monitored operating system. In addition to the topology data, both virtualization agent and operating system agent may provide correlation data that allows to identify for topology data describing a specific virtualized computer system to identify the topology data describing the operating system that runs on the virtualized computer system. Operating system agents may in addition provide monitoring data describing the processes running on the monitored operating system in a way that groups individual processes providing the same or similar functionality into process groups. The operating system agents may report monitoring and topological data based on process group instead of individual processes. Reporting based on process groups instead of individual processes is helpful to evaluate the availability of specific functionality over time, which provides more useful data to judge the performance and availability state of the monitored system than reporting and monitoring data based on individual process instances.

Variants of those embodiments may deploy virtualization agents monitoring the virtualization topology of the monitored computing environment and operating system agents monitoring the processes executed by operating systems and the communication activities performed by the monitored process. Additionally those embodiment variants may deploy transaction agents to processes involved in the execution of distributed transactions, those transaction agents may provide transaction tracing data enriched with service description data allowing to identify and describe the services that were called to fulfill the monitored transaction. The service description data may also contain correlation data allowing to identify the process group on which the service was executed and to identify the operating system on which the process is executed on which the service was called.

In yet other variants of those embodiments an individual or clustered monitoring node receives topology entity and relationship data and transaction trace and monitoring data from different agents and gradually forms a layered, integrated topology model reflecting virtualization, operating system and process execution, process communication and transaction related service call dependency aspects of the virtual and physical computing infrastructure and the deployed applications of the monitored data center.

The monitoring node may analyze data describing service calls being part of incoming transaction trace and monitoring data to identify services that are accessed from outside the data center. The monitoring data describing those outside accessible services may be analyzed to identify individual applications that are accessible from outside the data center. Multiple outside accessible services may be assigned to one application and internal services directly or indirectly accessed by one or more outside accessible services of an application may also be assigned to the application.

The monitoring node may incrementally create an integrated, layered topology model out of the received topology and transaction monitoring data. Each layer may describe a different view of the monitored computing infrastructure and applications, containing a specific type of topology entities. Each layer may also show the layer specific communication relationships between the entities of a specific layer. As an example, a process group layer may show all topology entities describing process groups. It may also show detected process communication activities. An operating system layer may show all topology entities describing operating systems and communication activities between operating systems. The communication activities of operating systems may be derived from the detected communication activities of processes running on the operating systems. The visualization of the layered topology model may stack the different layers in a way to position more functionality related layers like layers describing detected applications and services and their call relationships above layers describing the software and hardware related aspects of computing infrastructure like processes, operating systems or virtualization entities. Both the monitored application and the monitoring node may be fully or partially be installed in an environment that allows automatically adapt the used computing environment, like host computer systems, the CPU, memory and disk resources of those host computer systems and the bandwidth of the connecting computer network to the demands of the monitored application and the amount generated of monitoring data, like a private or public cloud computing environment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides an exemplary layered visualization of an integrated topology model of a monitored data center and the applications and services provided by the monitored date center.

FIG. 2 in addition shows an exemplary visualization of the vertical topological relationships of a specific, selected entity of the topology model.

FIG. 3 provides a block diagram of data center infrastructure monitored by different agent types, the different agent types providing monitoring data describing different topological aspects of the monitored data center. The monitoring data is processed by a monitoring node to create an integrated topology model of the monitored data center.

FIG. 4 displays a flow chart that conceptually describes the overall monitoring process.

FIGS. 5A-5C conceptually describe data records to transfer topology data provided by operating system agents, describing a monitored operating systems, the processes running on the monitored operating system and communication activities performed by those processes from operating system agents to a monitoring node.

FIG. 6 provides a block diagram of an operating system agent that monitors an operating system, the processes executed by the operating systems and the communication activities performed by the processes.

FIGS. 7A-7B provide flow charts that conceptually describe the processing performed by the operating system agent to create topology monitoring data.

FIGS. 8A-8C describe data records that may be used to represent and store the integrated topology model of the monitored data center.

FIG. 9 visually describes the process of correlating process communication activities reported by different operating system agents describing the endpoints of the communication activities to create corresponding horizontal relationships of the integrated topology model describing a communication between process groups.

FIGS. 10A-10C show flow charts describing the processing performed by the monitoring node to handle topology data received from operating system agents.

FIG. 11 provides a block diagram of a virtualization agent that identifies and reports virtualization aspects of a monitored data center.

FIGS. 12A-12C depict data records that may be used to transfer monitoring data describing the virtualization topology of the monitored data center from a virtualization agent to a monitoring node.

FIG. 13 visually describes the process of correlating topology data describing an operating system provided by an operating system agent with topology data sent by a virtualization agent that describes the virtualized computer system running the operating system.

FIGS. 14A-14B show flow charts of the processes performed by a virtualization agent and a monitoring node to create and process topology events describing virtualization aspects of the monitored data center.

FIG. 15 shows a block diagram of a transaction agent which is deployed to processes that participate in the execution of monitored distributed transactions. Transaction agents monitor and report transaction executions in form of transaction tracing and monitoring data. Parts of the transaction tracing and monitoring data representing an entry of the monitored transaction into the process to which the transaction agent is deployed by using a specific service interface provided by the process, is enriched with service identification data and with correlation data to identify the process group of the process and to identify the operating system that runs the process.

FIGS. 16A-6C visually describe the extraction of services and service call relationships out of transaction trace and monitoring data received from transaction agents, the creation of topology data describing operating systems and process groups and the integration of extracted service and service call relationships with corresponding process groups.

FIG. 17A and FIG. 17B show an exemplary service call request and an exemplary process command line and their separation into service and process group defining and identifying parts.

Corresponding reference numerals indicate corresponding parts throughout the several views of the drawings.

DETAILED DESCRIPTION

Example embodiments will now be described more fully with reference to the accompanying drawings.

The described embodiments are directed to a holistic, real-time discovery and monitoring of different topological aspects of computing infrastructure and applications executed on the computing infrastructure. Monitoring data describing individual entities or events, like individual processes executed by operating systems or transaction executions is grouped or split to form topology relevant entities. Examples are monitored processes which are grouped to process groups according to the functionality they provide and transaction trace data describing individual transaction executions that are split into a corresponding network of service calls.

Different topological aspects may be provided by types of agents deployed to the monitored computing environment. Virtualization agent may be used to detect and monitor virtualization aspects of the computing environment, operating system agents deployed to individual operating systems may provide operating system and process group related aspects and transaction agents deployed to processes involved in the processing of transactions may provide transaction tracing and monitoring data which may be used to extract service and service call related aspects of the monitored computing infrastructure and the applications executed by this computing infrastructure.

The transaction monitoring data describing service related topology aspects may also be used to identify services that are directly visible and accessible from outside the monitored computing environment. Those outside available services form the interface of applications provided to application end-users. Captured data describing those outside available services may be used to automatically identify those applications.

The topology monitoring data of each agent type contains correlation data that allows the integration of the agent type specific topology monitoring data with agent specific topology monitoring data from other agent types. A monitoring node may receive the topology monitoring data of all different agent types and incrementally build and update an integrated topology model of the monitored computing infrastructure and the executed applications in real-time. The integrated topology model may be used for various visualization, query and analysis tasks.

Figure 1:
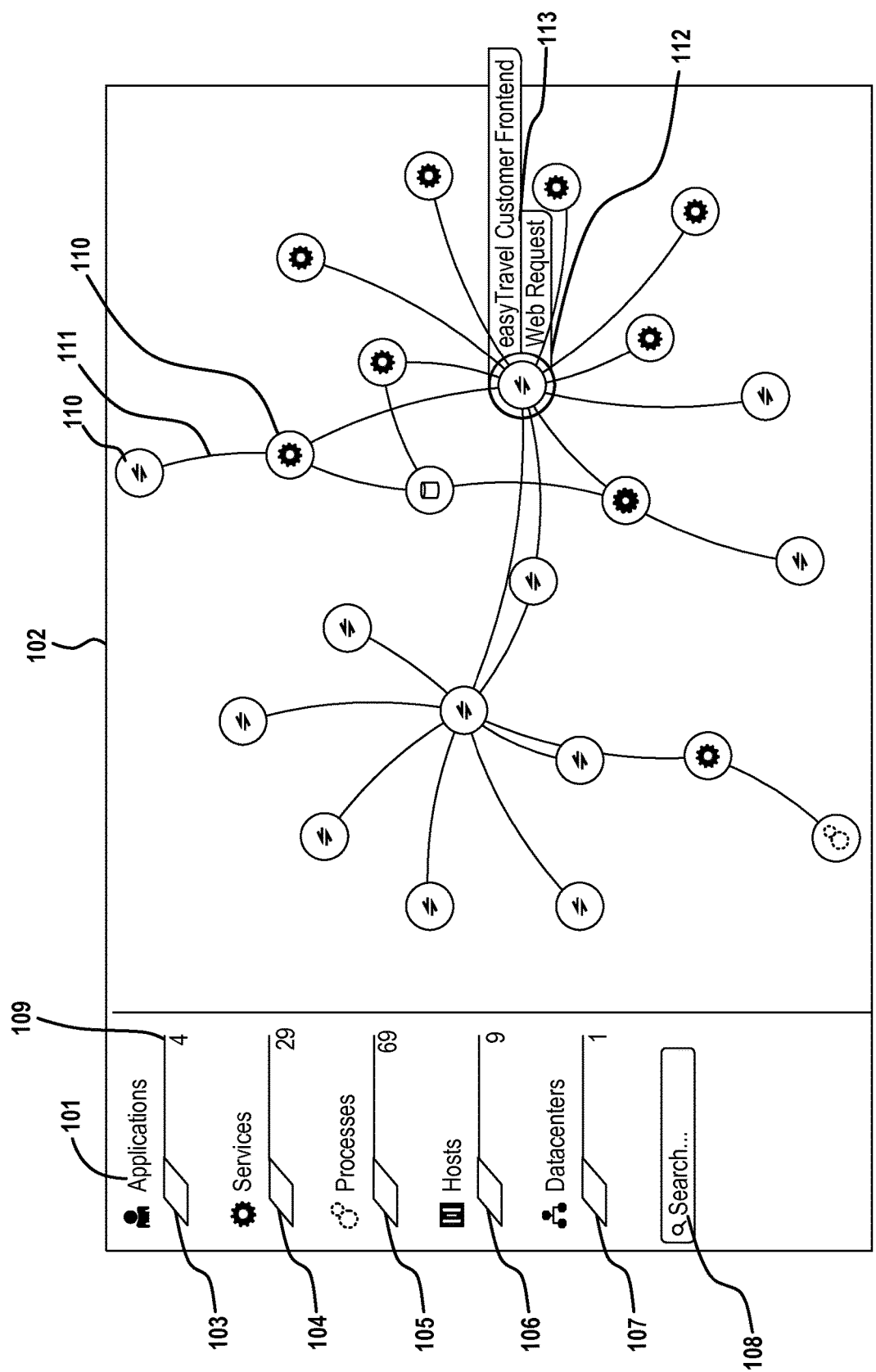

Referring now to FIG. 1 which shows an exemplary, layer based visualization of the integrated topology model. A layer navigation tool 101 is provided on the left side of the screen. The navigation tool allows to select the layer which is displayed in the data section 102 of the exemplary visualization. The available layers include but are not limited to an application layer 103 showing applications detected by the analysis of service calls from outside the monitored computing infrastructure, a services layer 104 showing detected services and service call dependencies extracted from transaction trace and monitoring data, a process layer 105 to show detected process groups and their communication, a hosts layer 106 to show the monitored hosts and operating systems and their virtualization aspects and a datacenters layer 107 showing location based groupings of the monitored hosts. A search tool 108 may be available to search the topology model for entities of the topology model with names or describing meta-data containing a specific entered text. A quantity summary 109 for each layer may provide the number of entities in a specific layer.

The layer navigation tool integrates and allows to navigate between functionality related layers like the application and service layer and infrastructure related layers like the process group, host and datacenter layers.

The services layer 104 is selected in the current screenshot and the data section 102 shows the detected services and their call relationships. Services are depicted as nodes 110 of graphs with edges 111 representing recognized service call relationships. An icon displayed in each service node identifies the type of the service, like web request service, database service, messaging service etc. Services with a name or meta-data matching the currently entered search text 108 are highlighted. For the service 113 that is currently selected by the user, by e.g. clicking on it or hovering over it with the mouse, additional data describing the selected service, like service name and service type 113 is displayed.

Figure 2:
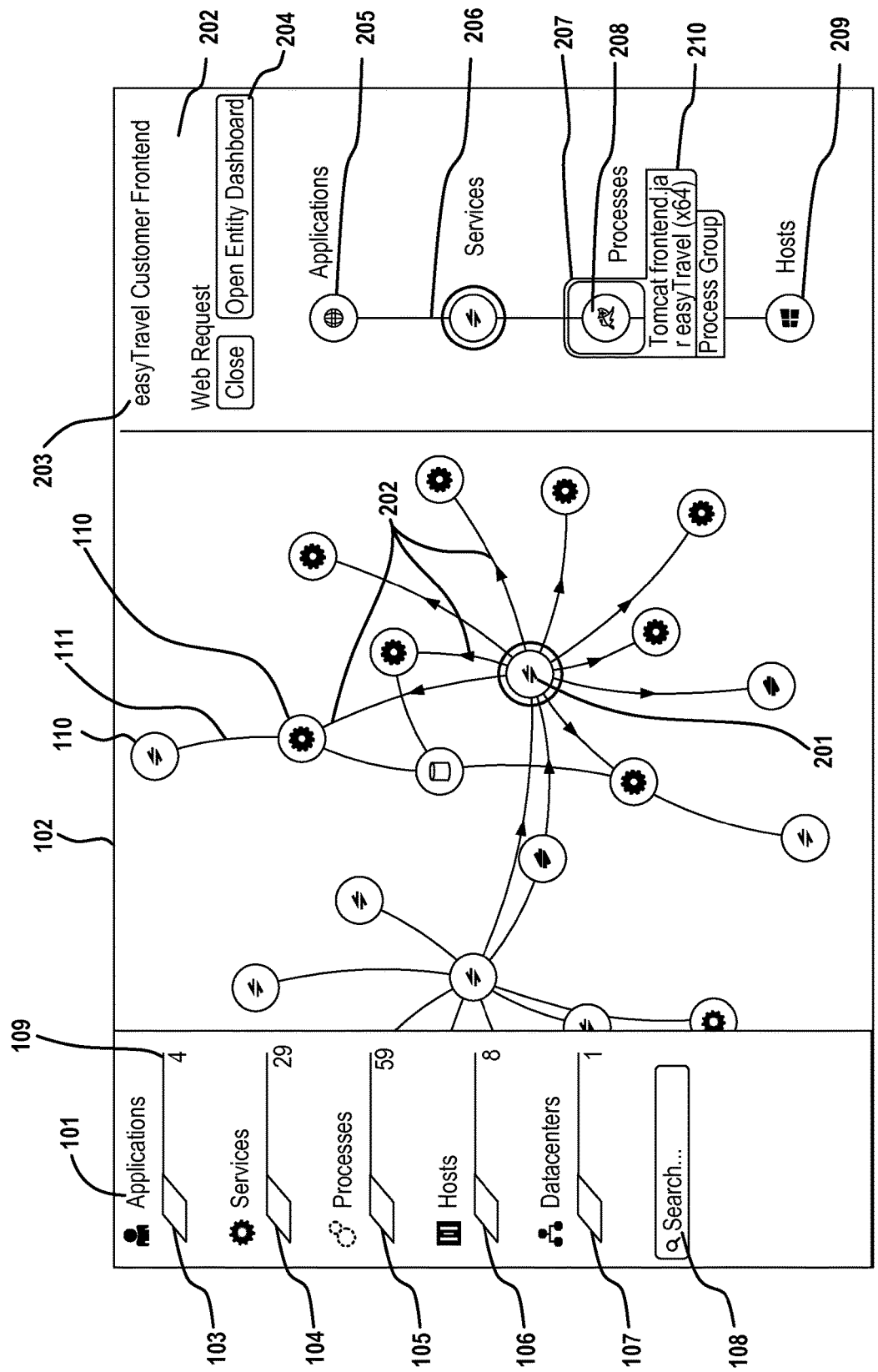

Referring now to FIG. 2 which shows an exemplary visualization of the vertical relationships of a selected service in the service layer. The vertical relationships of a service indicate to which application it belongs and which process groups provide the service. A process group has a vertical relationship to the computer host or hosts on which processes forming the process group are running. In case a host is virtualized, it has a vertical relationship to the hypervisor used to provide the virtualized hardware for the host. A hypervisor may have a vertical relationship to a virtualization manager that manages the hypervisor. Hosts, hypervisors and virtualization managers may have a vertical relationship to the datacenter to which they are deployed.

In the exemplary screenshot the service layer visualization is selected using the layer selector 101 as in FIG. 1. A specific service in the service relationship network is selected 201, e.g. by double clicking it. On selecting the service, vertical relationship view 202 is shown in addition to the horizontal view of the service layer 102. The vertical relationship view shows a representation of the currently detected service 206 and its vertical relationships. According to the screenshot, the selected service 201/206 belongs to an application 205 and is provided by one process group 208 and 207. There are two different visualizations of the process group shown in FIG. 2. A location independent visualization 207 may be used to group process groups providing the same functionality regardless of the operating system or host that runs the processes forming the process group. A location specific visualization 208 may group processes providing a specific functionality that are running on a specific host. The location specific process group 208 providing the selected service 206 has a vertical relationship to the host 209 that runs the processes forming the process group. The vertical relationship between the host 209 and the datacenter it belongs to is omitted as the monitored environment only consists in one datacenter.

On selecting one of the entities shown in the vertical relationship view 202, additional data describing the entity, like its type and name are shown 210. A concept of a combined location independent and location specific visualization as used for process groups 207 and 208 may also be provided for services 206.

The vertical relationship view 202 also provides a drill-down link 204 that opens a dashboard showing detailed meta- and monitoring data for the selected monitored entity 206.

Figure 3:
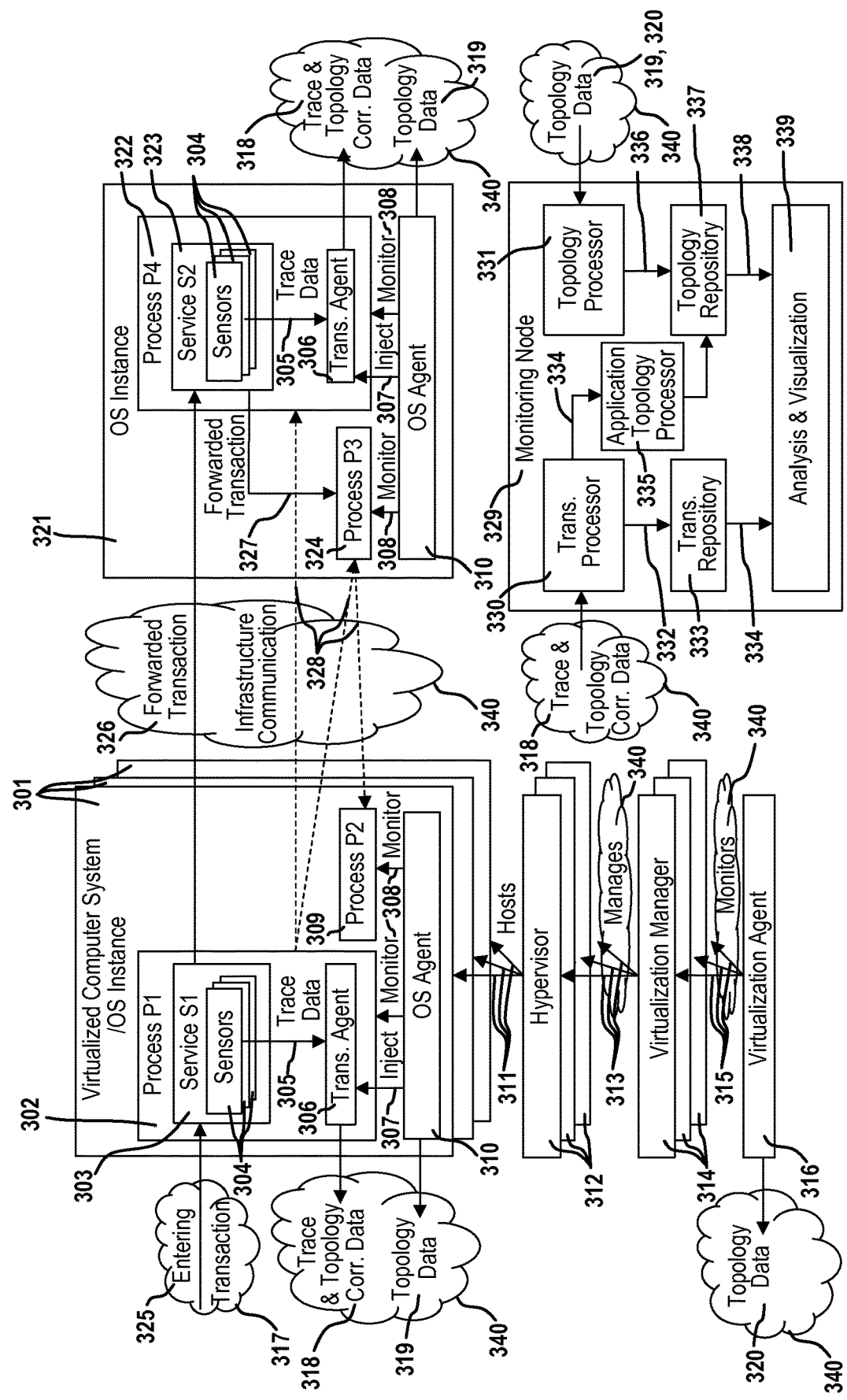

FIG. 3 shows a block diagram of a monitoring system that detects different topological aspects of monitored computing environment and that creates a multi-dimensional topological model of the monitored computing environment. FIG. 3 also shows an exemplary computing environment with deployed agents.

An operating system agent (OS agent) 310 is deployed to operating systems 321 and 301 contained in the monitored computing environment. The operating systems 321 may run on concrete hardware of a dedicated computer system, or may run 301 on virtualized hardware hosted 311 by a hypervisor. The OS agent may be installed on the monitored operating system by downloading and installing an executable program.

The OS agents 310 also monitor 308 processes 302, 309, 324 and 322 running on the operating systems they are monitoring. The monitoring of processes performed by the OS agents 310 may including but is not limited to the monitoring of start and termination of processes, the monitoring of resources consumed by individual processes and capturing process meta-data. The OS agent 310 may detect the type of a process and if the type indicates that the process is involved in the execution of distributed transactions, may inject 307 a transaction agent 306 into processes of this type. Processes potentially involved in the execution of distributed transactions include Java™, .NET™ processes which may be instrumented with transaction agents 306 using byte-code instrumentation and injection techniques, Web server processes, which may be instrumented with transaction agents 306 using extension mechanisms provided by those Web server processes to monitor HTTP traffic handled by the Web server process, or other processes potentially involved in the execution of distributed transactions, for which an appropriate type of transaction agent 306 is available. The OS agent 310 may on startup of a process use meta-data describing the started process, like the command-line of the process to determine the type of the starting process, determine if it is a process potentially involved in the execution of distributed transactions, identify based on the process type the matching type of transaction agent 306 and inject the transaction agent 306 with the matching type into the process. The transaction agents 306 use sensors 304 placed in the code that is executed by the monitored process to monitor the processing of parts of distributed transactions and to extract and create correlation data that allows to reconstruct individual end-to-end transactions out of partial transaction trace data provided by individual transaction agents 306. Additionally, the transaction agents detect incoming requests being part of distributed transactions, detect the type of service used to handle the incoming request, extract service identification data allowing to reconstruct service type, used service method and service parameters and attach the extracted service identification data to transaction trace data.

OS agents 310 evaluate process metadata describing the processes running on the operating system to identify the functionality provided by individual processes, group processes providing the same or similar functionality into process groups and report the identified process groups in form of topology data 319 to a monitoring node 329. In addition, the OS agents also monitors infrastructure communication activity 328 performed by processes. The detected communication activities are also reported to a monitoring node 329 as part of topology data 319. The monitoring node 329 is also referred herein as monitor or monitoring server. The topology data 319 is sent via a computer network 340 connecting the components like host computers, hypervisors etc. of the monitored computing environment. A detailed description of topology data sent by the OS agent 310 can be found in FIG. 5 and is described later.

The transaction agents 306 create transaction trace data allowing to reconstruct end-to-end transactions. The transaction trace data is enriched with topology correlation data allowing to identify the process group of the process performed a part of a monitored transaction and the operating system running the process. The created trace and topology correlation data 318 is sent to a monitoring node for correlation. The creating and processing of transaction trace and monitoring data to create end-to-end transaction traces is described in U.S. Pat. No. 8,234,631 "Method and system for tracing individual transactions at the granularity level of method calls throughout distributed heterogeneous applications without source code modifications" by Bernd Greifeneder et al. which is incorporated herein by reference in its entirety. In addition to transaction trace and correlation data as described in U.S. Pat. No. 8,234,631, the transaction agent 306 also detects, monitors and captures detail data of service invocations performed by the monitored transaction. The term "service" as used in this document in context of transaction tracing and monitoring refers to the part of a monitored distributed transaction that is executed within one process.

A transaction enters a process via a service request in form of e.g. a HTTP request or a remote method execution request received by a corresponding service entry point, like e.g. a method handling HTTP requests or remote method execution requests. The process local handling of the service request performed by the monitored distributed transaction is considered part of the service request, regardless if multiple threads are involved in the execution, as long as they are executed locally by the process that received the service request. If the process local handling of the service call performs call to a second process, this is considered second, nested service call. In case transaction agents 306 are deployed to the process and the second process, the transaction trace data by the agents would allow to reconstruct a detailed transaction trace, including process local thread switches and method calls. The additional service detection and monitoring functionality of the transaction agents allows to reconstruct more condensed, topological relevant data showing that e.g. a HTTP service was called on a first process which in turn called a remote method invocation service on another process. The detected services and their call relationships may e.g. be visualized in the service layer of a topology viewer as shown in FIG. 1 and FIG. 2.

The extracting of service topology data out of end-to-end transaction trace data is shown in FIG. 16 and described later.

A virtualization agent 316 is deployed to the monitored computing environment and configured to connect to and monitor 315 virtualization managers 314 of the monitored computing environment. A set of hypervisors 312 is connected to each virtualization manager 314. The virtualization managers 314 allow to start, stop, migrate and modify virtualized computer systems running OS instances 301 that are hosted by individual hypervisors. The virtualization managers 314 also provide interfaces to monitor connected hypervisors 312 and the virtualized computer systems 301 hosted 311 by those hypervisors 312. The virtualization agent accesses those monitoring interfaces and provides topology data 320 describing which virtualized computing system runs on which hypervisor and which hypervisor is managed by which virtualization manager. The topology data 320 provided by the virtualization agent 316 allows to correlate OS instance topology entities reported by OS agents 310 and describing an OS instance 301 running on a virtualized computer system with the corresponding topology entity reported by virtualization agent 316 describing the virtualized computer system running the OS instance. The topology data 320 is sent to a monitoring node 329 for correlation. Although FIG. 3 only shows one virtualization agent providing virtualization related topology data, it is possible to deploy multiple virtualization agents, each monitoring a different set of virtualization managers and providing virtualization related topology data to the same monitoring node. A detailed view of the topology data sent by the virtualization agent 316 is shown in FIG. 12.

The topology data from OS agents 310 and virtualization agents 316 is received by a monitoring node 329, which forwards it to the topology processor 331. The topology processor 331 processes the received topology data and updates the integrated topology model stored in the topology repository to reflect the topology changes reported by received topology data. The topology data received from OS agents and virtualization agents represents the topological infrastructure aspect of the monitored computing environment, as e.g. visualized in layer processes 105, hosts 106 and datacenters 107 of the exemplary topology data visualization displayed in FIG. 1.

The monitoring node 329 also receives trace and topology correlation data 318 from transaction agents 306. The transaction trace and topology correlation data 318 is processed by the transaction processor 330 to create end-to-end transaction traces which are stored in a transaction repository. Concurrently, an application topology processor 335 extracts service call topology data from transaction trace data together with topology correlation data allowing to identify process group and OS of the process executing a service. The application topology processor uses the extracted service topology data to update the application functionality related aspects of the topology model stored in the topology repository 337, like e.g. the application and service layer. The topology correlation data is used to connect topology entities describing specific services with the process groups providing those services.

The state of the monitored computing environment as described in FIG. 3 shows an entering transaction 325 which is received by process P1 302 via a computer network 317 that connects the monitored computing environment with an external environment like the Internet. The entering transaction is processed by process P1 302 by service S1 303. Various sensors are deployed to service S1 303, which report the entering transaction 325, its local processing and also the forwarded transaction 326 caused by the entering transaction 325, to the transaction agent 306 in form of trace data 305. The trace data also contains service identification data allowing to identify type and name of the service that received the entering transaction. The forwarded transaction 326 is received by service S2 323 of process P4 322. Sensors 304 deployed to service S2 report entry of the forwarded transaction via service S2, its local processing and the further forward of the transaction 327 to process P3 324. No transaction agent is deployed to process P3 and no detailed trace data describing the transaction processing by P3 is available. However, the transaction trace data provide by the sensors 304 deployed to service S2 323 allow to determine that the monitored transaction contained a call to process P3.

Figure 9:
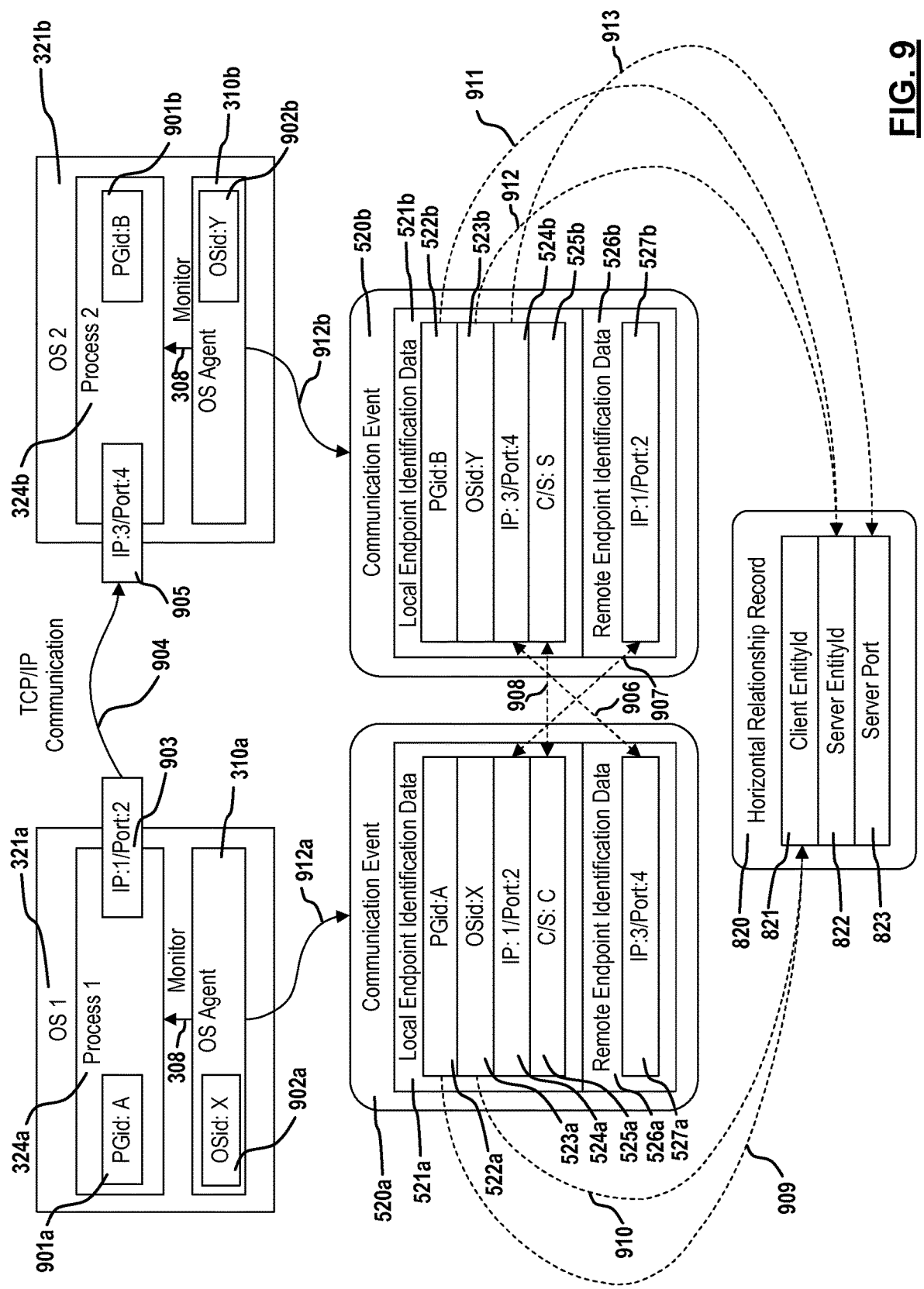

In parallel to the transaction processing performed by processes P1 302, P4 322 and P3 324, infrastructure communication 328 was performed by processes P1 302, P2 309, P3 324 and P4 322. Process P1 established a communication link with processes P4 and P3 and process P3 started a communication with process P2. The OS agents 310 deployed to the operating system running process P1 and P2 creates communication topology data describing the communication links of P1 to P3 and P4 and of P2 to P3 together with data to identify the process group of P1 and P2. The OS agent 310 deployed to the operating system running process P3 and P4 creates communication topology data describing the communication links of P3 and P4 together with the process group of P3 and P4. The monitoring node 329 receives the communication topology data from both sides and creates communication topology data describing the infrastructure communication on process group level. A detailed view of this process is depicted in FIG. 9.

Figure 4:
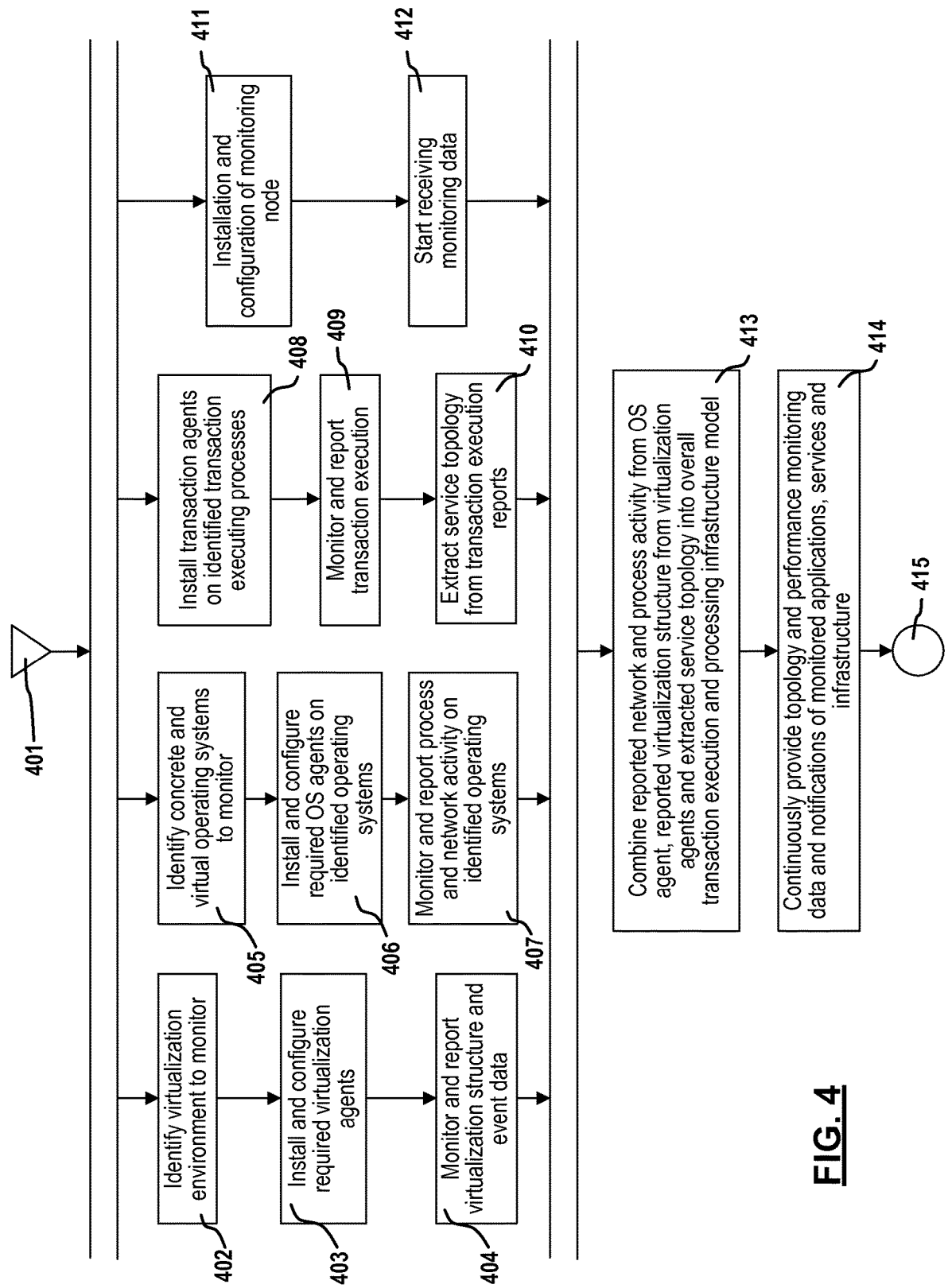

Referring now to FIG. 4 which provides a flow chart that describes the overall topology monitoring process. The process starts with step 401 with the decision to monitor a specific application execution or computing environment. After the initial step, the process forks into four paths dedicated to the monitoring of virtualization, process execution and transaction processing related aspects of the monitored computing environment and the installation and configuration of a monitoring node to receive and process monitoring data. Those paths may be executed in parallel. The path dedicated to the monitoring of virtualization environment starts with step 402 in which the virtualization environment of the monitored computing environment is identified. In step 402 it may be decided to monitor all, only a part of, or none of the virtualization environment. In subsequent step 403 one or more virtualization agent 316 is installed in the monitoring computing environment and configured to monitor the virtualization infrastructure as decided in step 402. The virtualization agents 316 may be implemented as standalone hardware component which is connected to the computer network 340 of the monitored computing environment, a software component running in a process of a host computer of the monitored computing environment or a combination of both. After the installation and configuration of the virtualization agent in step 403, it is started and afterwards performs monitoring and reporting of virtualization structure and event data in step 404. Virtualization structure data may contain data describing the virtualized computer systems hosted by hypervisors or data describing the hypervisors controlled and managed by a virtualization manager. Virtualization event data may contain data describing the startup and shutdown of virtualized computer systems, hypervisors or virtualization managers or start and end of the migration of a virtualized computer system between hypervisors. The virtualization event data may in addition contain data describing configuration changes of virtualization environment, like adding or removing CPU, memory or disk resources to hypervisors or virtual machines, or the move of virtual machines between hypervisors. In addition it may contain data describing the resource utilization of individual virtualization environment entities. Step 404 ends the virtualization specific path of the process, and the process continues with step 413.

The process path dedicated to the monitoring of operating system and process topological aspects starts with step 405, in which the operating systems that should be monitored are selected, regardless if they run on concrete, physical or on virtualized hardware. In subsequent step 406, OS agents 310 are installed and configured on previously selected operating systems. Different OS agent executables may be available for and installed on different types of operating systems, like Microsoft Windows™, Linux or Apples Mac OS™ or iOS™. After installation and configuration, the OS agents may be started in step 407 and begin to monitor and report topology data describing the processes executed by the operating system and their network activity. Step 407 ends the process path dedicated to the setup of operating system and process activity monitoring and the process continues with step 413.

The process path dedicated to the monitoring of transaction processing, extracting of services and service relationships and detection of applications is started with step 408, in which transaction agents 306 may be installed in processes potentially involved in the execution of transactions. Step 408 may automatically be performed by an OS agent installed on an operating system that starts a process, the automatic transaction agent 306 installation may be controlled by filter mechanisms that e.g. selects processes which are instrumented by a transaction agent not only be the type of the process (e.g. Java™ virtual machine, .NET™ process, Webserver process) but also by metadata describing those processes, like the process command line. As an example, only processes that have a command line that matches a certain pattern may be instrumented with a transaction agent 306. The automatic installation of process specific transaction agents may be performed according to the teachings of U.S. Provisional Patent application 62/218,136 entitled "Method and System For Automated Injection Of Process Type Specific In-Process Agents On Process Startup" which is incorporated herein in its entirety by reference. In case of no installed OS agent, the instrumentation of processes with transaction agents may be performed manually. The manual transaction agent instrumentation may be performed by modifying the command line of a process by adding a directive that loads and installs a library containing the transaction agent functionality.

After the transaction agents are installed and configured, they start to monitor transaction executions and provide tracing data describing those transaction executions with step 409. Subsequent step 410 analyzes transaction monitoring data and extracts topology data identifying services and service call relationships from the transaction monitoring data. The extraction of service topology data may be performed by transaction agents, OS agents or a monitoring node individually or in cooperation. Step 407 ends the process path dedicated to the setup of transaction monitoring and service topology extraction and the process continues with step 413.

The process path directed to the setup of a monitoring node, either as a single node or a cluster of cooperating monitoring nodes is stared with step 411, in which a monitoring node is installed to the monitored computer system. The monitoring node may either be implemented as hardware component that is connected to the network of the monitored computing system, a process performed by an operating system being part of the monitored computer system or a combination of both. The installed monitoring node 329 may be configured to allow the reception of monitoring data from all or a subset of all virtualization, OS and transaction agents deployed to the monitored computing environment. The reception of monitoring data from those agents starts with step 412 which ends the process part dedicated to the setup of a monitoring node and the process continues with step 413.

After the process paths to install different agent types and the monitoring node are finished, the process continues with step 413, in which the monitoring node processes and combines incoming virtualization, process execution, process communication, service and service call relationship data into an integrated, multi-dimensional topological model of the monitored environment. Subsequent step 414 starts a continuous update of the topology model according to subsequent received monitoring data. The process ends with step 415.

Figure 5A:
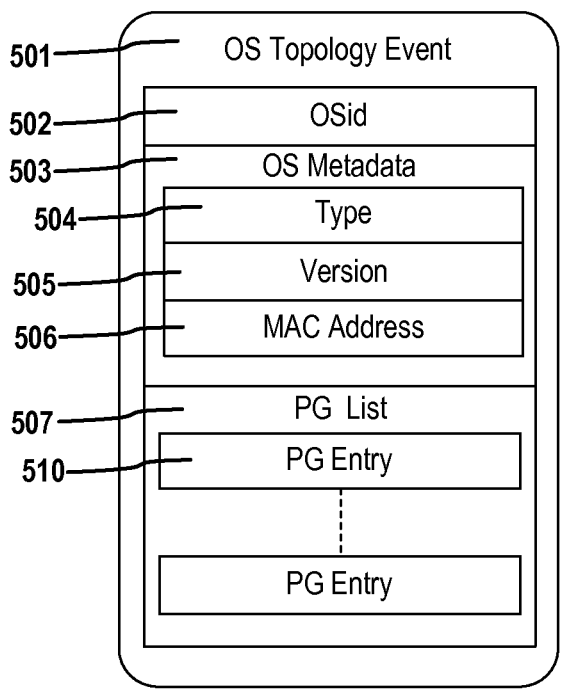
Figure 5B:
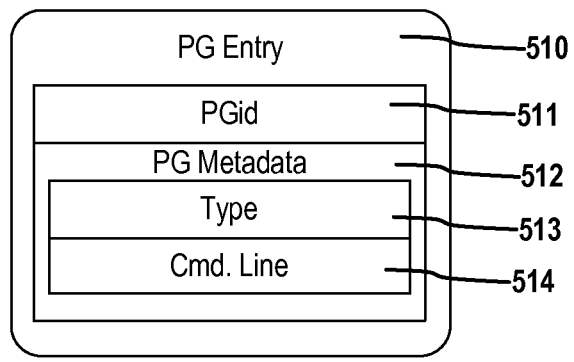
Figure 5C:
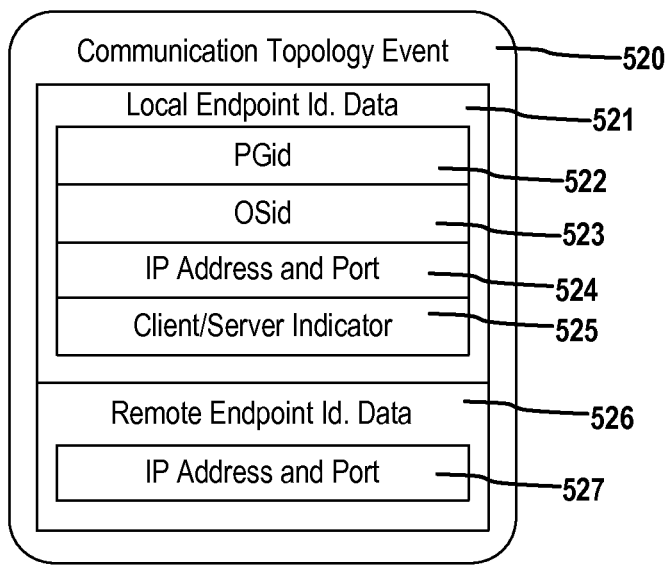

Data records to transfer topology data created by OS agents to monitoring nodes are displayed in FIG. 5. OS topology events 501 shown in FIG. 5a, process group entries 510 shown in FIG. 5b and communication topology events shown in FIG. 5c together form the topology data 319 created and sent by OS agents 310.

An OS topology event 501 may be used to store and transfer data to identify and describe a specific monitored operating system and a description of the processes executed by the operating system grouped according to the functionality that the executed processes provide. An OS topology event 501 may contain but is not limited to an OSid 502 providing an identifier that uniquely identifies the described operating system instance, a OS metadata section 503 containing data that describes the operating system and a process group list 507 containing process group entries 510 that describes process groups of processes executed by the operating system grouped by their functionality. The OS metadata section 503 of an OS topology event 501 may contain but is not limited to an entry describing the type 504 of the operating system, an entry containing the version 505 of the operating system and an entry containing the media access control (MAC) address 506 of the operating system. The MAC address uniquely identifies the network interface of the operating system. Typically, an operating system operates only one network interface and has only one corresponding MAC address. In case an operating system maintains multiple network interfaces, the field MAC address 506 may contain multiple entries.

A process group entry (PG entry) 510 contains but is not limited to a process group identifier (PGid) 511, that uniquely identifies a group of processes according to their functionality within the scope of the operating system executing the processes and a process group metadata (PG metadata) section 512 containing data that describes the process group. The PG metadata 512 of a PG entry contains but is not limited to a process type 513 e.g. indicating if the processes of the group are Java™, .NET™, other managed processes or native processes and a command line 514 entry containing the command that was used to start the processes belonging to the described PG. The process type may also be structured and contain type identification of the processes forming the process groups on different levels. Exemplary, a first level of the process type may specify that the process group contains Java™ processes, a second level may indicate that the processes in the group are all running a specific, Java™ based application server, like an IBM WebSphere™ or an Oracle Glassfish™ application server. In addition, the PG metadata 512 may contain data describing the process group itself, like e.g. the current number of processes being part of the process group described by the PG entry 510.

Communication topology events 520 may be used to transfer monitored communication activities of processes from OS agents to monitoring nodes. A communication topology event describes the endpoints (server and client) of a communication activity of a process. For the local communication endpoint, it also contains data identifying the process group of the local process involved in the communication and the operating system of the local process. Matching communication topology events identifying different process groups as endpoints of a communication activity may be correlated by a topology processor and stored in form of a vertical relationship record 810 modelling a communication between process groups. In a TCP/IP based network communication, an endpoint is identified by an IP address, a TCP/IP port and an indicator indicating sever or client side. A communication topology event 520 may contain but is not limited to a local endpoint identification data section 521 and a remote endpoint identification data section 526. A local endpoint identification data section 521 may contain but is not limited to a PGid 522 identifying the process group of the process providing the local connection endpoint, an OSid 523 identifying the operating system and host computer running the process that provides the local connection endpoint, an IP address and a port 524 identifying the local connection endpoint itself and a client/server indicator 525 indicating whether the described local endpoint is a client or server side endpoint. A remote endpoint identification data section 526 may contain but is not limited to an IP address and a port 527 identifying the remote endpoint of the communication activity described by the communication topology event 520.

Figure 6:
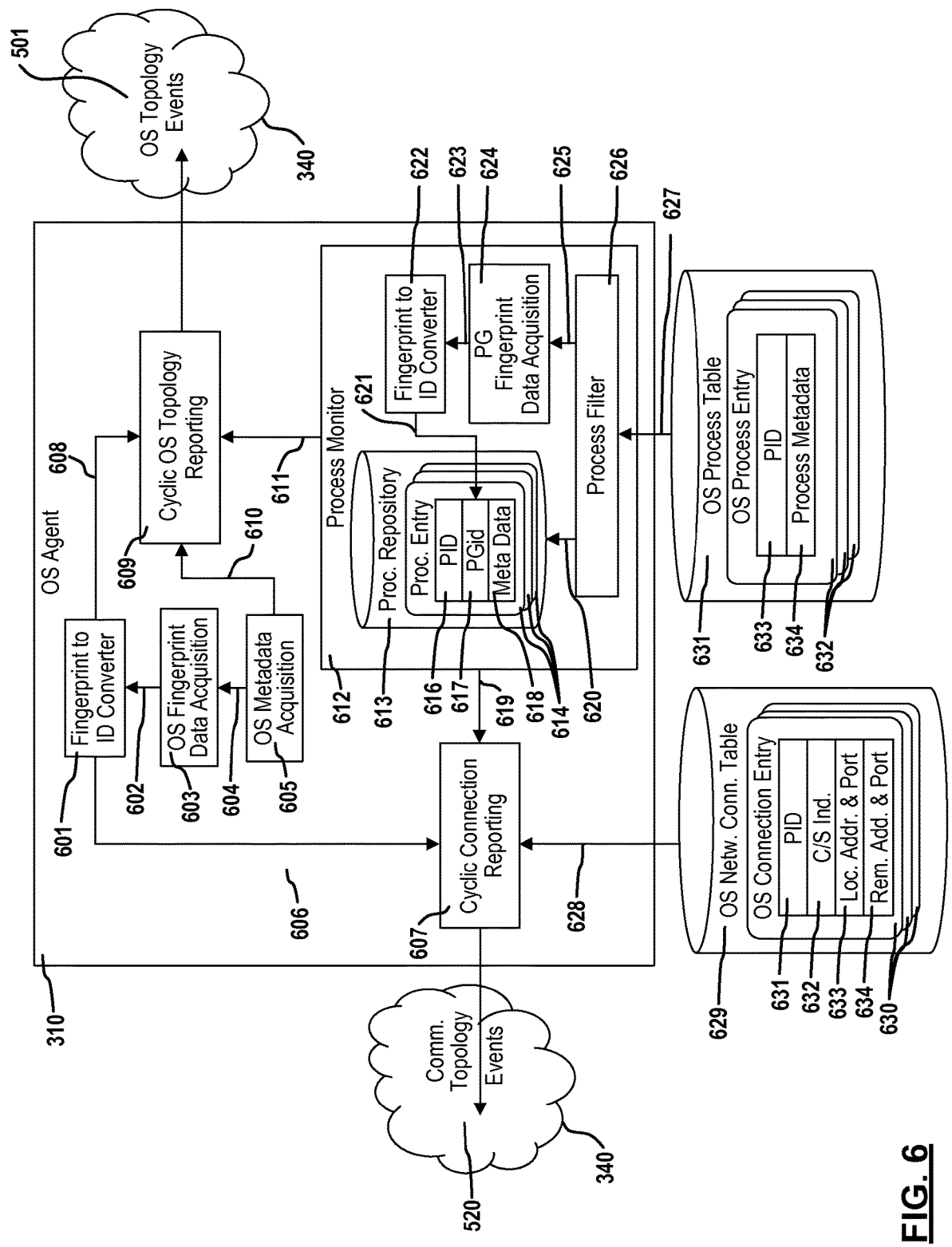

Referring now to FIG. 6, which provides a block diagram of an OS agent 310 which may be deployed to an operating system running on a host computer and that may be used to provide topology data describing the operating system, the processes running on the operating system and the communication activities performed by those processes.

The OS agent 310 may be downloaded to a computer host and installed in a way that it is started after installation and also started after each restart of the computer host to which it is installed.

The OS metadata acquisition module 605 of an OS agent queries data from resources locally available on the computer host and provided by the operating system running on the computer host that describe and identify the specific monitored computer host and operating system. Acquired metadata describing the computer system may contain but is not limited to type and number of available processors, performance parameters of those processors, amount of available physical memory, type and number of available hard disks, type and vendor of the computer system and an indicator if the computer system is virtualized. Acquired operating system specific metadata may contain but is not limited to type, vendor and version of the operating system, IP addresses and MAC addresses of network interfaces operated by the computer system. IP and MAC addresses identify a specific host computer and operating system in a computer network.

The acquired metadata is forwarded 604 to the OS fingerprint data acquisition module 603, which extracts parts of the metadata that uniquely identify the specific host computer and operating system. This fingerprint data is forwarded 602 to a fingerprint to id converter 601, which uses a mapping mechanism that creates corresponding numeric identifies for provided input data to generate a value for the OSid of the monitored operating system and host computer. One example for fingerprint data identifying an operating system is the MAC address of its network adapter or adapters, as it is typically immutable and uniquely identifies a host computer. An example for a mapping mechanism to create numeric identifiers out of fingerprint data is the MD5 hash algorithm, which creates numerical hash values of fixed length out of input data of variable length and has a hash collision probability (two different input data create the same hash value) that is sufficiently low (lower than 1/1 trillion).

For virtualized hardware, MAC addresses may be changed for some reasons. To overcome such situations, fingerprint data and OSid may be acquired and stored in a file on a hard disk of the host computer at the first run of the OS agent. For subsequent runs of the OS agent, e.g. after a restart of the host computer, fingerprint data and OSid may be read from the file. Creating the OSid once and storing and reusing it also allows to use a creation timestamp of the OSid as hash input data to increase uniqueness. The OSid is used by the cyclic connection reporting module 607 and the cyclic OS topology reporting module 609 to enrich created topology data with identification data of the monitored operating system and host computer.

An OS agent 310 contains a process monitoring module 612 which uses available operating system data describing currently running processes, conceptually described e.g. in form of an OS process table 631, to monitor processes that are currently running on the monitored operating system. Interfaces to access this data and format of the data may vary between operating system types and versions and OS agents need to be aware of this and use a process monitor module 612 appropriate for the specific operating system type and version. However, the structure of the retrieved data describing the currently running processes conceptually follows the structure of an OS process entry 632, which contains but is not limited to a PID or process identifier 633 which uniquely identifies a currently running processes (an already terminated process may have had the same PID as a currently running process, but the operating system assures that all concurrently running processes have a distinct PID) and a set of process metadata 634 containing data that describes the process identified by the PID. Process metadata may contain but is not limited to the command line used to start the process, a textual description of the process, the vendor of the process executable, name and path of the process executable and a list of libraries or other modules loaded by the process. The process metadata may also contain data describing the resources currently used by the process, like the amount of used CPU cycles or main memory. The process monitor 612 cyclically fetches 627 the data from the OS process table 631 and uses a process filter 626 to remove processes from the data fetched form the OS process table 631 that are not relevant for the topology of the monitored system. Filtering may be black and white list based to remove unwanted processes like the pseudo system idle process on Microsoft Windows™ operating systems which describe the amount of currently unused CPU cycles and to assure that processes which are monitored by transaction agents 306 are also monitored by the process monitor 612. In addition, resource utilization parameters like used CPU and memory consumed by the processes may be used to remove processes with a resource consumption lower than a certain threshold. Further, processes not involved in any communication activity may also be removed by the process filter 626.

The process group fingerprint data acquisition module 624 uses process metadata 634 retrieved from the OS process table to generate data identifying and describing the process group to which each process described by an OS process entry 532 belongs.

As an example, the process group finger print data acquisition module may analyze the command line of a process and the libraries and modules loaded by the process. Requirements for process group fingerprint data are that processes providing the same or similar functionality provide the same process group fingerprint data and that the fingerprint data created for a process before a restart of the process is equal to the process finger print data created after a process restart. The process executable specified in the command line of a process or libraries loaded by a process may be used to identify the process group of the based on the process type. Examples of such detected process types include but are not limited to Java™, .NET™, Python, Node.js, PHP or native process. After the type of the process is determined, a further type specific analysis of command line and loaded modules may be performed to determine process finger print data that further and more exactly defines the process group. As an example, if it is already detected that the type of the process is running a Java™ virtual machine, a further command line analysis specific for the analysis of Java™ process command lines may be performed to identify e.g. the name of the main class or the jar file loaded on start of the Java virtual machine. Determined main class or jar file name may in addition be used as process fingerprint data. In case the process type indicates a .NET process, a .NET specific analysis may be employed to determine the type of the .NET process. This analysis may e.g. determine if the .NET process is a worker process being part of a Microsoft™ Internet Information server (IIS). On determination of an IIS worker process, a further IIS worker process specific analysis may be performed to determine the application pool name of the IIS worker process. Both the application pool name and an indicator that the .NET process is an IIS worker process may be used as process fingerprint data. An IIS may run multiple applications, an application pool may be assigned to each application of the IIS. The name of an application pool identifies its corresponding IIS application, and multiple worker processes may be assigned to an application pool and started and stopped on demand according to the load of the corresponding IIS application.

The process group fingerprint data created by the PG fingerprint data acquisition module 524 for each filtered OS process entry is forwarded to the fingerprint to id converter 622 of the process monitor 612 which creates a corresponding numerical id for each received fingerprint data set.

In parallel, the process repository 613 of the process monitor 612 may also request 620 the filtered OS process entries 632 provided by the process filter 626 to create a list of process entries 615 that represent the currently running, filtered processes on the host, with an association to the corresponding process group of each process as determined and calculated by the PG fingerprint data acquisition module 624 and the fingerprint to id converter 622. The process repository 613 may, for each OS process entry 632 received from the process filter 626, create a process entry record 614. A process entry 614 may contain but is not limited to a PID or process identifier 616, which identifies a running process within the scope if the operating system that runs it, a process group identifier or PGid, identifying the process group of the process as determined by the process monitor, and process metadata 618. Process metadata 618 and PID 616 may be set to the corresponding value of the corresponding OS process entry 632 and the corresponding PGid may be provided by fingerprint to id converter 622 and PG fingerprint data acquisition module 624.

The cyclic OS topology reporting module 609 may cyclically request 610 OS metadata from the OS metadata acquisition module 605 and may also request 611 the process entries 614 from the process monitor 612 to create OS topology events 501. The frequency of OS topology event creation may be chosen in a way to find a good tradeoff between usage of network bandwidth and computing resources for monitoring and the up-to-datedness of the provided topology data. Frequencies ranging from once every 10 seconds to once every 5 minutes represent an acceptable compromise and may be adjusted according to available network bandwidth and computing resources.

The cyclic OS topology reporting module 608 creates an OS topology event 501, and sets its OSid 502 to the OSid provided by the fingerprint to id converter 601 of the OS agent 310 and sets the OS metadata 503 with data retrieved from the OS metadata acquisition module 605. To create PG entries 510 representing the processes currently running on the OS monitored by the OS agent, the cyclic OS topology reporting module 609 fetches 611 the process entries 614 from the process repository 613 of the process monitor 612. A PG entry 510 is created for each distinct PGid 617 received with process entries 614 and its PGid 511 is set to the distinct PGid. For each created PG entry 510, the process entries 614 with a matching PGid are used to create an aggregated value for process group type 513, and command line 514 representing the processes of the process group. Typically, processes in a PG have a homogeneous type and command line, but in case processes in a PG have different types or command lines, type 513 and command line 514 field of a PG entry 510 may be adapted to contain a list of types or command lines instead of a single type or command line. The type or types of a PG entry 513 may be extracted from process metadata 618 as described earlier, e.g. like the processing performed by the PG fingerprint data acquisition module 624 to determine the type of a process. The created and initialized PG entries 510 may be added to the PG list 507 of the created and initialized OS topology event 501, which will afterwards be sent to a monitoring node 329 via a connecting computer network 340.

The cyclic connection reporting module 607 cyclically queries the fingerprint to id converter 601 of the OS agent 310, the process repository 613 of the process monitor 612 and the OS network connection table 629 to create and send communication topology events 520. The cyclic connection reporting module 607 first fetches 628 OS connection entries 630 from the OS network connection table 629 provided by the monitored operating system. The OS connection entries 631 represent currently ongoing network activities grouped by involved processes. Format and way to access the OS network connection table may vary from operating system type and version, and an OS agent must provide appropriate access and interpretation mechanism for the operating system type and version it is deployed to. However, from a conceptual consideration, the data provided by an OS network connection table 629 is as described by OS connection entries 631 which may contain but are not limited to a PID 631 identifying a specific process, a client server (C/S) indicator indicating if the described connection endpoint provides the client or server side of a communication, a local communication address and port 633 and a remote communication address and port 634.

After fetching the OS connection entries 630, the cyclic connection reporting module 607 queries for each OS connection entry 630 the process repository 613 for a process entry 614 with a matching PID 616 to retrieve the corresponding PGid 617. For those OS connection entries 630, for which a matching process entry and a corresponding PGid 617 is available, the cyclic connection reporting module 607 creates a corresponding communication topology event 520. The OSid 523 of each created communication topology event 520 is set to the OSid fetched from the fingerprint to id converter 601, IP address and port 525 and client server indicator 525 of the local endpoint id data 521 and IP address and port 527 of the remote endpoint id data 526 are set to corresponding values for an OS connection entry 630. The PGid 522 is set to the PGid 617 of the process entry 614 that corresponds to the OS connection entry via a matching PID. The created and initialized communication topology events 520 are sent to a monitoring node 329 via a connecting computer network 340.

The created OS topology events 501 describe the topological entities detected and monitored by an OS agent, the created communication topology events 520 provide data that allows to correlate monitored communication activities with the local topology entities involved in the communication activities, like process groups, and that also allows to identify corresponding remote communication endpoints. The data identifying remote communication endpoint may be used to resolve remote topological entities involved in the described communication.

The processes performed by the OS agent 310 to generate and report topology data are shown in FIG. 7. FIG. 7a shows the determination of topology data describing process group and operating system entities and FIG. 7b depicts the determination of topology data describing the communication activities of process groups.

The process of determining and reporting OS topology data starts with step 701, when e.g. a specific time since the last reporting of OS topology data has elapsed. Subsequent step 702 requests process entries 614 from the process repository 613 of the process monitor.

The update of process entries 614 in the process repository may in some embodiments be performed synchronous with a request received from the cyclic OS topology reporting module 609 or the cyclic connection reporting module 607 or it may in other embodiments be performed asynchronous to incoming requests. In case of a synchronous update, the process repository 613 would on an incoming request trigger fetching and filtering of current OS process entries 632 and creation of corresponding process entries 614 and then return the created process entries. In case of an asynchronous update, the process repository would maintain a local update cycle that is independent of incoming requests and perform an update of process entries within this local update cycle. An incoming request for process entries 614 would receive the process entries as created with the last local update cycle of the process repository.

The received process entries 614 contain a PID identifying a process, metadata 618 describing the process and a PGid 617 identifying the process group to which the process belongs.

Following step 703 determines distinct PGids of the received process entries 614 and creates a PG entry 510 for each detected distinct PGid. Afterwards, step 703 sets the PGid 511 of the created PG entry 510 to the distinct PGid and fetches for each created PG entry 510 the process entries 614 with matching PGid 617. Metadata of process entries 614 with matching PGid 617 are aggregated and stored in the PG metadata 512 fields of the corresponding PG entry 510.

Subsequent step 704 creates an OS topology event 501 and adds the PG entries 510 created in previous step 703 to the PG list 507 of the created OS topology event 501. Step 705 afterwards fetches the OSid identifying the operating system and host to which the process agent is deployed from the fingerprint to id converter 601, sets it to the OSid field 502, fetches OS metadata describing the monitored operating system and host from the OS metadata acquisition module 605 and stores it in the OS metadata field 503 of the created OS topology event 501. Following step 706 sends the created OS topology event 501 to the monitoring node and the process ends with step 707.

The process of monitoring and reporting communication activities of processes running on the operating system and host starts with step 710, when a specific time since the last communication reporting has elapsed. Subsequent step 711 fetches the process entries 614 from the process repository and following step 712 fetches for each process entry 614 OS connection entries 630 with a PID 631 equal to the PID 616 of the process entry 614. Afterwards, step 713 creates for each corresponding process entry 614 and OS connection entry 630 a communication topology event 520, sets the PGid 522 of the local endpoint id data 521 to the PGid 617 of the process entry 614, the OSid 523 to an OSid identifying the monitored operating system and host as provided by the fingerprint to id converter 601, the local address and port 633 and the C/S indicator 632 of the OS connection entry 630 to IP address and port 524 and C/S indicator 525 of the local endpoint id data 521 and sets the remote address and port 634 of the OS connection entry to the IP address and port field 527 of the remote endpoint id data section 526 of the communication topology event. Following step 714 sends all created communication topology events 520 to the monitoring node 329 and subsequent step 715 terminates the process.

Reporting of OS topology data as described in FIG. 7a and reporting of communication topology data as described in FIG. 7b may either be performed synchronized, i.e. at the same point in time and with the same frequency, at the same frequency but at different points in time (i.e. phase-shifted) or with different frequencies.

Figure 8A:
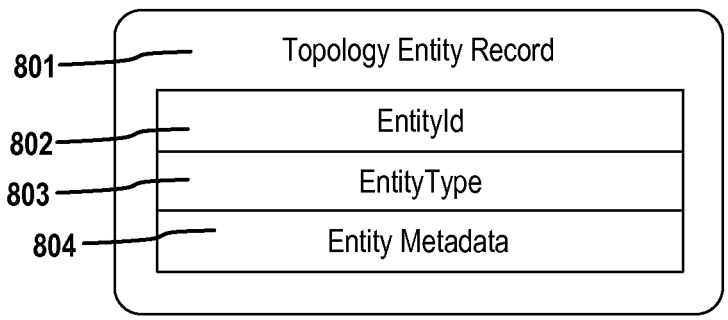
Figure 8B:
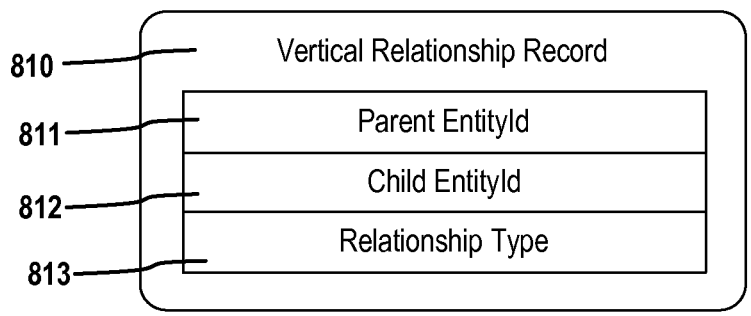
Figure 8C:
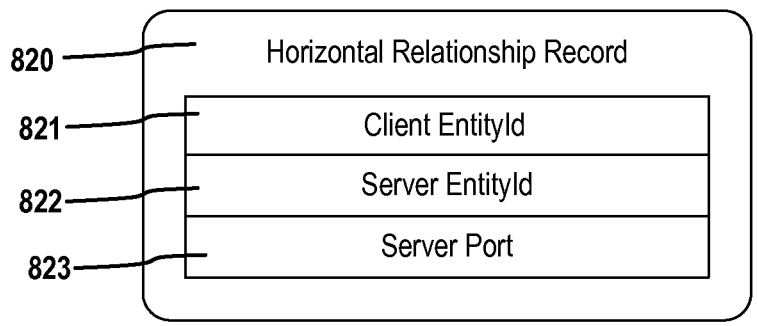

Generic data records that may be used to describe a combined, multidimensional topological model of the monitored computing environment are shown in FIG. 8. Topology entity records 801 may be used to describe detected topological entities of the monitored computing infrastructure. A topology entity record 801 may contain but is not limited to an entityId 802 uniquely identifying a specific monitored entity, an entityType 803 to identify the type of the topology entity, and entity metadata 804 describing a specific topological entity. Detected and monitored entity types may include but are not limited to data centers types describing a group of concrete and/or virtualized hosts and corresponding virtualization infrastructure, virtualization managers, hypervisors, individual concrete and virtualized hosts and corresponding operating systems, process groups, services and distinctive service components like service methods and applications. The entity metadata 804 may contain entity type specific, descriptive data that identifies and describes the topology entity. As an example, for entities describing an operating system or host, it may contain type and version of the operating system, like e.g. "Microsoft Windows™", "Version 8.1", type, number and performance parameters of processors, hard disks and network interfaces of the host computer and amount installed main memory. For topology entities 801 with an entity type indicating a process group, the entity metadata 804 may contain data further specifying the type of processes of the process group, like native processes, processes running virtual machines, type and version of the virtual machine, in case the virtual machine runs an application server, type and version of the application server. The entityType 803 of a topology entity record determines the topological type of the entity as e.g. service, process group or operating system and further determines the topological layer (cf. topology layer navigation tool 101 in FIG. 1). The metadata section 804 of a topology entity record may contain data further defining and refining the type of the entity. For topology entity records 801 describing services, this may contain data further identifying the type of the service (e.g. HTTP, Web Service or remote method call), for operating system entities this may contain type and version of the operating system and for process groups the types (native, Java™ or .NET™) of the processes contained in the process group.

For hardware virtualization related topology entries like hypervisors or virtualization managers, the entity metadata 804 may contain data describing type and version of the used virtualization software, like "VMWare Hypervisor" and "Version 5.5". In addition, metadata describing the hardware configuration of hypervisors and virtualization managers may be part of the corresponding entity metadata 804.

The metadata 804 for entities describing organizational or geographic grouping of multiple concrete or virtualized computer hardware and the corresponding virtualization components like topology entities of the type data center may contain a name of the datacenter, its geological location and a description of its functionality in context of the organization operating the data center.

Topology entity records 801 describing application functionality and transactional aspects of the monitored topology, like applications, services and service methods may for applications, services and service methods contain a name for the entity that may either be automatically extracted from the access point data or assigned manually and for services and service methods further contain data describing the type of the entity to e.g. distinguish HTTP Request, Web Service or remote method invocation services and data identifying an access point for the service like a TCP/IP port number.

Vertical relationship records 810 may be used to model relationships between different topology entities on different vertical levels of the topological model. As an example, a vertical relationship record may be used to model that a virtualized host computer system is virtualized by a specific hypervisor, that a specific hypervisor is managed by a specific virtualization manager, that a specific process group is running on a specific host computer system or that a specific process group provides a specific service.

A vertical relationship record 810 may contain but is not limited to a parent entityId 811 identifying the topology entity record describing a topological entity that hosts, runs, provides or contains a specific other topological entity that is identified by a child entityId 812 and a relationship type 813 that classifies the type of the vertical relationship. A vertical relationship 810 describing e.g. that a specific process group is running on a specific host computer would e.g. have a parent entityId 811 identifying the specific host computer, a child entityId 812 identifying the specific process group and a relationship type 813 specifying a vertical relationship describing that a process group runs on a host computer system.

Horizontal relationship records 820 may be used to model communication activities between different topological entities of the same type or on the same topological level. A horizontal relationship record 820 may contain but is not limited to a client entityId 821 identifying the topology entity record that models the topological entity that performed the client side part of a communication, a server entityId 822 identifying the topological entity that performed the server side of the communication and a server port 822 further identifying the server side part of the communication activity. In addition, a horizontal relationship record may contain a field specifying the type of the communication like e.g. TCP or UDP.

Horizontal relationship records may e.g. be used to model monitored communication between processes forming process groups. The client entityId 821 may identify the process group of a process that initiated a TCP/IP connection, server entityId 822 may identify the process group of a process that served the TCP/IP connection and the server port 823 may identify the server side port used to perform the communication. The server port of a TCP/IP communication is a long lived property of a process that is configured to receive TCP/IP connections from various client processes. The client port of a TCP/IP connection may be chosen by the client process on an arbitrary basis out of the available free TCP/IP ports on the host computer running on the client machine and is a short lived property that is discarded after the end of the communication. Consequently, the server port 823 provides topological relevant data, whereas the client port is only relevant for individual, typically short lived communication activities and is therefore omitted by the topology model.

In addition, horizontal relationship records may also be used to model service or service method call relationships derived from transaction tracing and monitoring data sent by sensors and transaction agents that forms end-to-end transaction trace data. As an example, a monitored end-to-end transaction trace may contain a service method call, which is received by a specific process and handled by a specific thread within the process. At a specific point of processing of the service method call, a request to another service method, provided by another process is sent. The end-to-end transaction trace data contains all this information, and may be used to extract and create topology relevant data like services, service methods and service call relationships. As an example, topology entity records 801 may be extracted describing both involved service methods and a horizontal relationship record 820 may be created with client entityId identifying the calling service, a sever entityId 822 identifying the called service and a server port 823 identifying the server port on which the called service is available.

Besides those horizontal relationships 820 that are directly extracted from monitoring data received from different agent types, also aggregated horizontal relationships may be created that describe communication activities on different topological levels. As an example, horizontal relationships describing the communication activities of specific process groups running on specific host computer systems may be aggregated and used to specify a horizontal relationship between the specific host computer systems running the process groups.

Referring now to FIG. 9, which visually describes the correlation of communication topology events 520 send by different OS agents 310 and describing the opposite endpoints of one monitored process communication.

A process 1 324*a* residing on an operating system OS 1 321*a* initiates a TCP/IP communication 904 with a process 2 324*b* residing on an operating system OS 2 321*b*. The IP address assigned to OS 1 321*a* is "1" and the IP address of OS 2 321*b* is "3". OS agents 310*a* and 310*b* are deployed to both OS 1 321*a* and 0S2 321*b* and calculate an OSid "X" 902*a* for OS 1 321*a* and an OSid "Y" for OS 2 321*b*. Process 1 324*a* running on OS 1 321*a* is monitored 308 by the OS agent 310*a* deployed to OS 1. OS agent 310*a* calculates a process group id (PGid) "A" 901*a* for process 1 324*a*. The PGid 901*b* of process 2 324*b* is calculated by OS agent 310*b* and has the value "B".

Process 1 324*a* initiates a TCP/IP connection 904 to a TCP/IP service addressed by IP address "3" on port "4" 905 and uses the local port 2 903. The local IP address "1" is determined by OS 1 on which process 1 is running. OS 2 321*b* receives the connection request and forwards it to process 2 321*b* which is registered as handler for incoming TCP/IP connections on port "4".

After the connection is established the process agent 310*a* deployed to OS 1 performs cyclic connection reporting (see e.g. FIG. 6, element 607). The cyclic connection reporting produces a communication topology event 520*a*, with local endpoint identification data 521*a* configured to identify the process group of process 1 321*a* by a PGid 522*a* set to "A", the OS running the process by setting the OSid 523*a* to "X", the IP address and port field to "1" for the IP address part and the port part to "2" to identify the local endpoint and the client server indicator 524*a* set to indicate the client side of the communication. The IP address and port field 527*a* of the remote endpoint identification data 526*a* is set to indicate IP address "3" and port "4".

Simultaneously, the OS agent 310*b* deployed to OS 2 321*b* also performs cyclic connection reporting and creates a communication topology event 520*b* describing the communication as monitored by the OS agent 310*b* deployed to OS 2 321*b*.

The local endpoint identification data 521*b* of the created communication topology event 520*b* is set to identify the process group of the receiving process by setting the PGid 522*b* to "B" and setting the OSid 523*b* to "Y" to identify the OS running the receiving process. Further, the IP address and port field 524*b* is set to indicate IP address "3" and port "4" and the client server indicator 525*b* is set to indicate the server side endpoint of the communication. The IP address and port field 527*b* of remote endpoint identification data 526*b* is set to indicate IP address "1" and port "2".

Both communication topology event 520*a* created by OS agent 310*a* and communication topology event 520*b* created by OS agent 310*b* are sent to the same monitoring node 329, which forwards them to the topology processor 331 for correlation. The topology processor 331 compares 907 the IP and port field 523*a* of the local endpoint identification data of first received communication topology event 520*a* with the IP address and port field 527*b* of the remote endpoint identification data 526*b* of a second received communication topology event 520*b* and also compares 906 the remote IP address and port 527*a* of the first communication topology event 520*a* with the local IP address and port 524*b* of the second received communication topology event. In case compares 907 and 908 indicate a match, the client server indicators of both communication topology events 520*a* and 520*b* are checked 908 to indicate opposing (one indicating client side the other server side) communication endpoints.

On a bidirectional match of remote and local IP address and port (compares 906 and 907) and detected opposing client server indicators (check 908), the topology processor 331 creates a corresponding horizontal relationship record 820 by using PGid 522*a* and OSid 523*a* of the communication topology event 520*a* describing the client side endpoint of the communication to create and set a client entityId 821 identifying the process group with PGid "A" running on the operating system with OSid "X", using PGid 522*b* and OSid 523*b* of the communication topology event 520*b* describing the server side endpoint to create and set a server entityId 822 and setting the server port 823 of the created horizontal relationship record 820 to the port specified by IP address and port field 524*b* of the local endpoint identification data 521*b* of the communication topology event 520*b* with client server indicator 525*b* indicating the server side endpoint of the communication.

The created horizontal relationship record 820 describes the monitored communication on a topology relevant, process group level.

Figure 10:
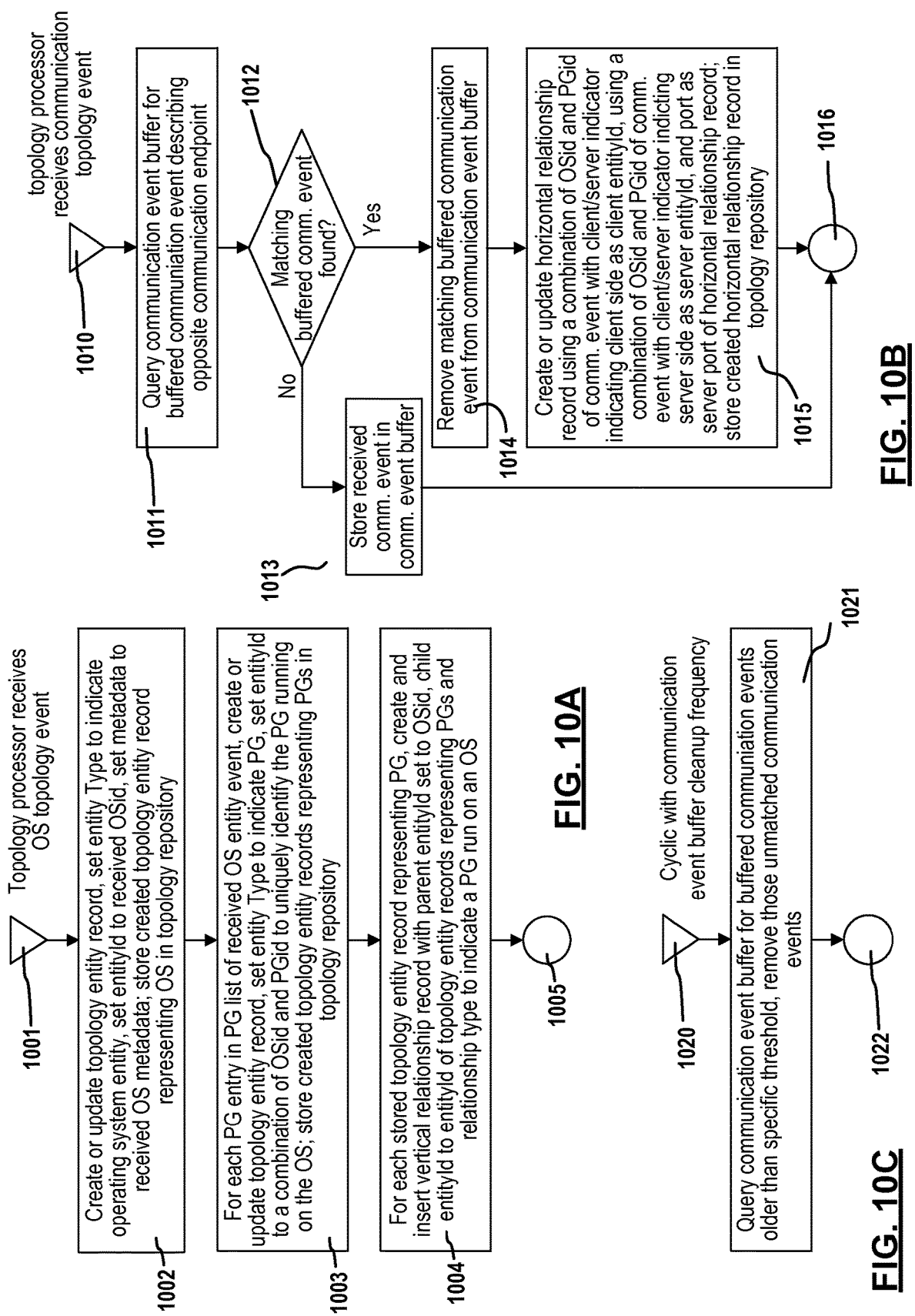

Coming now to FIG. 10, which conceptually depicts the processing of OS entity events 501 and communication topology events 520 by the topology processor 331.

The processing of OS topology events 501 to create corresponding topology entity records 801 describing the reported operating system and process groups running on the operating system is described in FIG. 10*a*. The process starts with step 1001 when the topology processor 331 receives an OS topology event 501 and continues with step 1002 which creates or updates a topology entity record describing the operating system reported by the incoming OS entity. Step 1002 may query the topology repository 337 to determine if a topology entity record with entityType 803 indicating an operating system and entityId 802 matching the OSid of the incoming OS topology event already exists. In case a matching topology entity record already exists in the topology repository, this matching one is fetched and updated with new data received with the OS topology event 501. Otherwise, a new topology entity record 801 is created, its entityType 803 is set to indicate an operating system, the entityId 802 is set to the OSid 502 of the received OS topology event 501, and the OS metadata 503 of the received OS topology event 501 is set to the entity metadata field 804 of the created or fetched topology entity record 801. The created or updated topology entity record 801 representing the operating system notified by the received OS topology event 501 is stored in the topology repository 337.

Following step 1003 creates or updates topology entity records 801 representing the process groups (PGs) running on the monitored operating system. The PG entries 510 of the PG list 507 of the received OS topology event are fetched. Afterwards, step 1003 checks for each PG entry 510 if a corresponding topology entity record 801 is already available in the topology repository 337.

Such a corresponding topology entity record 801 would have an entityType 802 indicating a process group and an entityId 802 either matching the PGid 511 of a received PG entry in combination with a vertical relationship record 810 indicating that the process group is running on the notified operating system (i.e. parent entityId 811 equals OSid 502 of received OS topology event 501, child entityId 812 equals PGid 511 of the received PG entry 510 and relationship type 813 indicates a process group running on an operating system) or having an entityId 802 matching a concatenation or other unique combination of the received OSid 502 and a received PGid 511. A combination of PGid and OSid to globally identify a process group is required because processes running on different operating systems may be assigned the same PGid. Both variants to achieve global uniqueness and identifiability of topology entity records describing process groups 801 may be used by described embodiments without leaving the scope and spirit of the invention. See also discussion of location independent and location specific visualization in the description of FIG. 2.

In case a corresponding topology entity record 801 for a PG entry 510 is found in the topology repository 337, the entity metadata 804 is updated with the PG metadata 512 of the corresponding PG entry. For PG entries with no existing corresponding topology entity record, a new one is created, its entityType 803 is set to indicated a process group, its entityId 802 is either set to the PGid of the PG entry (location independent id) or to a combination of OSid and PGid (location dependent id), its entity metadata 804 is set to the PG metadata 512 of the corresponding PG entry 510 and the created topology entity record 801 is inserted into the topology repository 837.

Subsequent step 1004 creates a vertical relationship record 810 for each created topology entity record 801 representing a process group. The created vertical relationship records 810 indicate that modelled process groups run on the operating system as notified by the received OS topology event 501. The relationship type 813 of the created vertical relationship records are set to indicate a process group running on an operating system, the parent entityId 811 is set to the OSid 502 of the received OS topology event 501 (equals the entityId 802 of the topology entity record representing the operating system) and its child entityId 812 is set to the entityId 802 of the created topology entity record 801 representing a process group. The created vertical relationship records 810 are inserted into the topology repository 337 and the process ends with step 1005.

The processing of incoming communication topology events 520 by the topology processor 331 is conceptually described in FIG. 10*b*. The process starts with step 1010 when the topology processor 331 receives a communication topology event 520. In subsequent step 1011, the topology processor 331 queries its communication event buffer for a buffered communication topology event 520 describing the opposite communication endpoint of the received communication topology event. This may e.g. performed by querying for a communication topology event with a crosswise match of local 524 and remote 527 IP address and port fields and opposing client server indicator 525.

The communication event buffer is used to store communication topology events 520 for which no corresponding communication topology event 520 representing the opposing communication endpoint has been received. As the OS agents that monitor communication activities on different operating systems and hosts operate independently and asynchronous to each other, corresponding communication topology events 520 typically arrive at the topology processor 331 at different points in time. The communication event buffer is used to keep unpaired communication topology event 520 until the corresponding opposing communication topology event is received.

In case step 1012 detects that no corresponding opposing communication topology event is available in the communication event buffer, the process continues with step 1013 which stores the received communication topology event 520 in the communication event buffer and the process ends with step 1016.

If otherwise step 1012 detects that a corresponding opposing communication topology event is available, the process continues with step 1014 which removes the corresponding topology event record 520 from the communication event buffer. Subsequent step 1015 checks if a horizontal relationship record 820 representing the communication described by the two matching communication topology events 520 is already available in the topology repository 337. This may e.g. be performed by searching for a horizontal relationship record 820 with a client entityId 821 corresponding to PGid 522 and OSid 523 of the communication topology event 520 with client server indicator 525 indicating the client side endpoint of the communication and a server entityId 822 corresponding to PGid 522 and OSid 523 of the communication topology event 520 with client server indicator indicating the sever side endpoint of the communication and with a sever port 823 equal to port section of the IP address and port field 524 describing the server side endpoint of the communication. In case a matching horizontal relationship record 820 is found, it may be updated with data received with the two communication topology events. If no matching horizontal relationship record 820 is found, a new one is created, its client entityId 821 is set to identify the process group performing the client side part of the communication, its server entityId 822 is set to identify the server side process group and its server port 823 is set to the port used by the server side communication endpoint. The created and initialized horizontal relationship record 820 is inserted into the topology repository 337 and the process ends with step 1016.

Creating or updating of topology entity records 801, vertical relationship records 810 or horizontal relationship records 820 may also contain setting or updating data describing the availability or existence of topological entities or relationships between topological entities. As an example on creation of such topology records 801, 810, 820, the creation timestamp may be captured and stored as part of the topology record indicating the point in time when it was monitored the first time. On each update of a topology record, the update timestamp may be captured and stored as part of the topological entity to indicate that the specific topological entity was available at the specific point in time. The recorded creation and update timestamps may be used to determine the point in time when specific parts of the topology models were reported the first time, the most recent time or they may be used to describe and visualize the historical development of the topological model over time.

The process which cyclically removes outdated communication event records 520 from the communication event buffer of the topology processor 331 is depicted in FIG. 10c. The process is started with step 1020, when a specific time since the last removal of outdated communication event records has elapsed. The time between subsequent executions of this process may be chosen in a way to avoid unnecessary runs due to no outdated communication event records and to prevent excessive memory usage by outdated communication events residing in the communication event buffer. Example execution frequencies include once every minute or once every five minutes.

Following step 1021 queries the communication event buffer for communication topology events which are older than a specific threshold. This threshold is chosen in a way to guarantee that no more matching opposing communication topology event can be expected from any OS agent. A threshold time of e.g. twice the time between two executions of cyclic connection reporting 607 as performed by the OS agent 310 may be chosen. Those buffered communication topology events 520 for which no matching opposing communication topology event can be expected any more are removed from the communication event buffer. The process then ends with step 1022.

Such outdated communication topology events may either be discarded or, in another variant embodiment, used to enrich the topological model with data describing incoming (derived from outdated server side communication topology events) or outgoing (derived from outdated client side communication topology events) process group communication.

Figure 11:
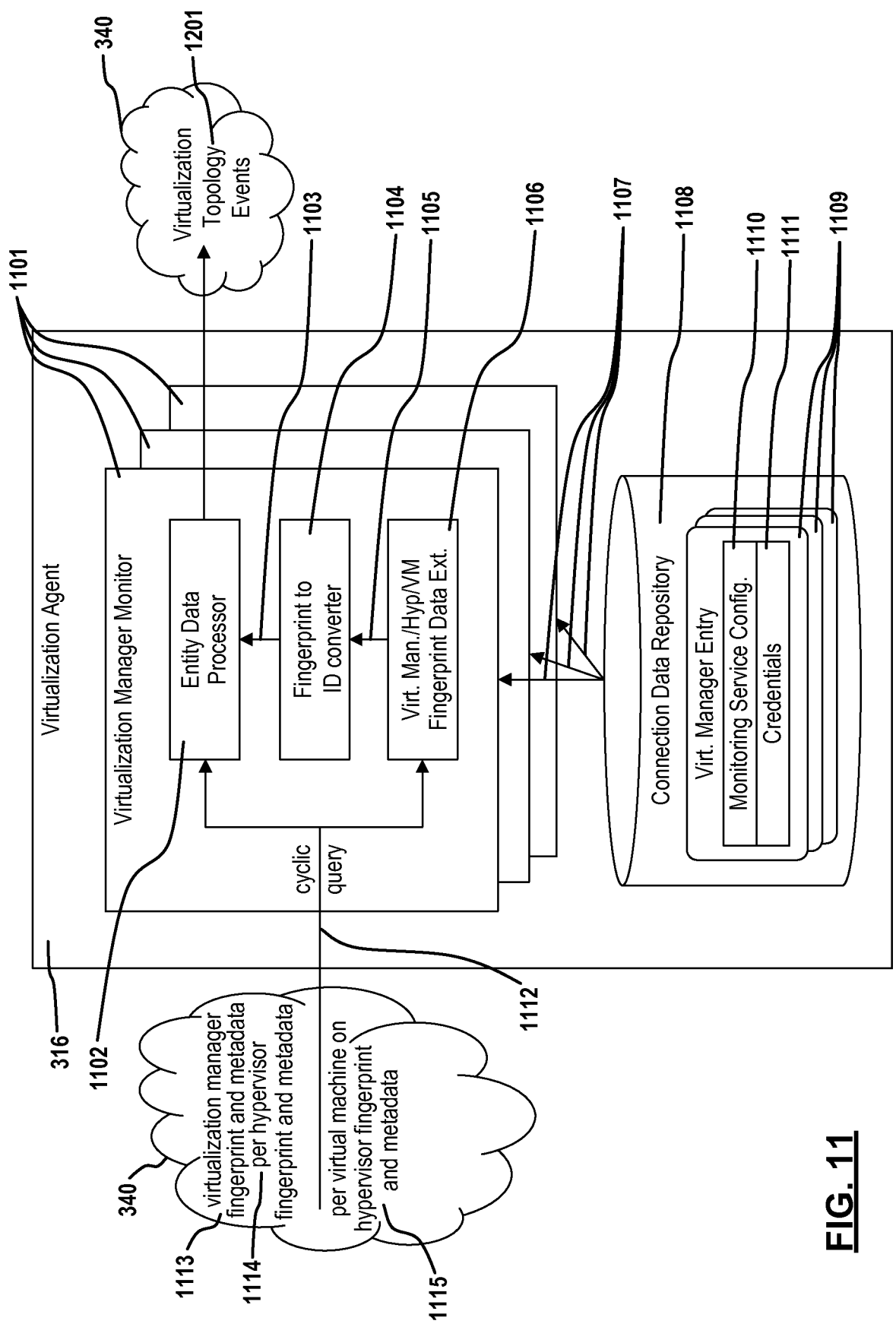

Referring now to FIG. 11 which provides a block diagram of the virtualization agent 316, which may monitor and report virtualization related topological entities and relations between those entities, like virtualization managers 314, configured to manage and monitor 313 a set of hypervisors 312 which in turn may be configured to provide a set of virtualized computer systems 301.

A virtualization agent 316 may consist in a connection data repository 1108 containing virtualization manager entries 1109, each virtualization manager entry 1109 providing data to access a monitoring service provided by a virtualization manager in form of a monitoring service configuration 1110 and credentials 1111 required to access the monitoring service. For each virtualization manager entry 1109, the virtualization agent may create and maintain a corresponding 1107 virtualization manager monitor 1101. Each virtualization manager monitor 1101 may be implemented and configured to query topological relevant data describing and identifying the corresponding virtualization manager 314, the hypervisors 312 controlled and managed 313 by the virtualization manager and virtualized host computer systems 301 provided and hosted 311 by those hypervisors 312.

A virtualization manager monitor 1101 may consist in virtualization manager, hypervisor and virtualized hardware fingerprint data extractor 1106, a fingerprint to id converter 1104 fetching 1105 fingerprint data from the fingerprint data extractor 1106 to create corresponding numeric identifiers out of fingerprint data. The created numeric identifiers are provided to an entity data processor which uses them, together with metadata describing the monitored virtualization infrastructure components to create virtualization topology events 1201. A virtualization manager monitor may cyclically query 1112 the monitoring interface of the virtualization manager 314 to fetch fingerprint and metadata describing the monitored virtualization manager 1113, the hypervisors managed by the virtualization manager 1114 and the virtualized computer systems provided by those hypervisors 1115. The frequency in which the cyclic query 1112 may be performed may be adapted to the required timeliness of the virtualization related topology data. A query frequency between once per minute to once every five minutes may be chosen.

The data received with the cyclic query 1112 is forwarded to the fingerprint data extractor 1106 and the entity data processor 1102. The finger print data extractor 1106 extracts data that uniquely identify each of the virtualization infrastructure components, like the network address and name of the components and forwards 1104 the extracted data to the fingerprint to id converter 1104 which creates corresponding numeric identifiers for the fingerprint data and provides 1103 the created numeric identifiers to the entity data processor in a way that allows to identify corresponding metadata for each identifier. The data received with the cyclic query 1112 is also provided to the entity data processor 1102 which uses the metadata contained in the query result together with the numeric identifiers provided by the fingerprint to id converter 1104 to create and send corresponding virtualization topology events 1201. The virtualization topology events describe and identify the monitored virtualization manager, hypervisors and virtualized computer systems by their corresponding metadata and numeric identifier and they also describe relationships between the monitored virtualization infrastructure components, like e.g. which virtualized computer system runs on which hypervisor or which virtualization manager manages which hypervisor.

This exemplary embodiment describes a virtualization agent 316 that interacts with a virtualization manager to access topological data describing hypervisors and virtualized computer systems controlled by the virtualization manager. However, the virtualization agent 316 may also be implemented and configured to access hypervisors directly via a provided monitoring interface in case no virtualization manager is available.

The vCenter™ software provided by VMware is an exemplary virtualization management system providing a monitoring interface as described above. The vCenter software may be used to control and monitor multiple ESX™ or ESXi™ hypervisors. ESX and ESXi are hypervisor implementations provided by VMware and may either be run standalone or managed by a vCenter server. Both ESX and ESXi hypervisors provide a monitoring interface that allows accessing topological data describing the hypervisor and the virtualized computer system hosted by the hypervisor in case no corresponding vCenter is available.

Figure 12A:
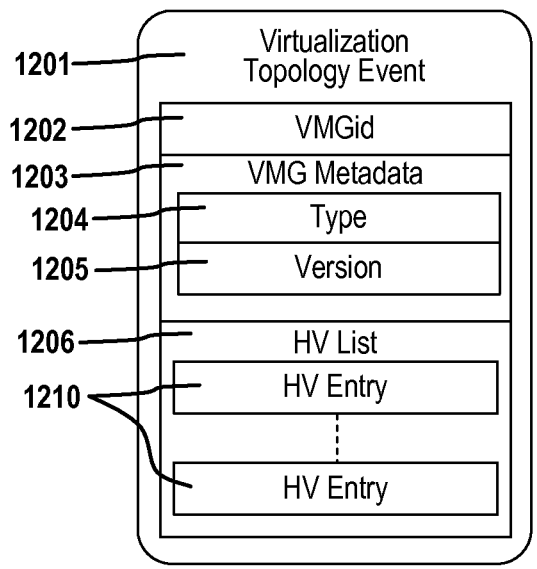

Data records that may be used to transfer virtualization specific topology data from virtualization agents 316 to a monitoring node 329 are depicted in FIG. 12. A virtualization topology event 1201 which may be used to describe a virtualization manager is shown in FIG. 12*a*. Such a virtualization topology event 1201 may contain but is not limited to a virtualization manager id (VMGid) which may be set by the virtualization agent to a numerical value corresponding to fingerprint data identifying the virtualization manager, a virtualization manager metadata section 1203 describing the virtualization manager 314 and a hypervisor list (HV list) 1206, containing one or more hypervisor entries (HV entry) 1210, each hypervisor entry identifying and describing a hypervisor 312 managed by the virtualization manager 314. The VMG metadata section 1203 of a virtualization topology event may contain but is not limited to data describing the type 1204 of the virtualization manager, its software version 1205, the name of the software vendor or data describing the hardware of the computer system running the virtualization manager.

Figure 12B:
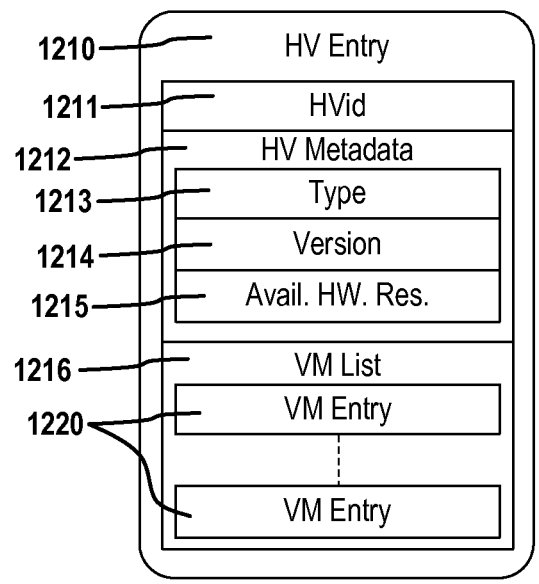

HV entries 1210 as shown in FIG. 12*b* may be used to store and transfer data identifying and describing a specific hypervisor. A HV entry 1210 may contain but is not limited to a HVid 1211 identifying a specific hypervisor 312, a HV metadata section 1212 describing the hypervisor and a virtual machine list (VM list) 1216 containing virtual machine entries (VM entries) 1220 describing the virtualized computer systems currently hosted by the hypervisor.

The HV metadata section 1212 of a HV entry 1210 may contain data describing type 1213, and version 1214 of the hypervisor software installed on the hypervisor machine and data describing the available hardware resources 1215 of the hypervisor. Data describing the available hardware resources may include but is not limited to number, type and performance of CPUs of the hypervisor hardware, amount of main memory, number, type and size of hard disks or data storage systems installed or attached to the hypervisor or number and type and bandwidth of installed network cards.

Some of the hardware components or resources of a hypervisor, like data storage devices or network cards may alternatively be described as individual topological entities connected to the entity describing the hypervisor via a vertical relationship identifying the hypervisor as parent and the respective hardware component or resource as child.

Figure 12C:
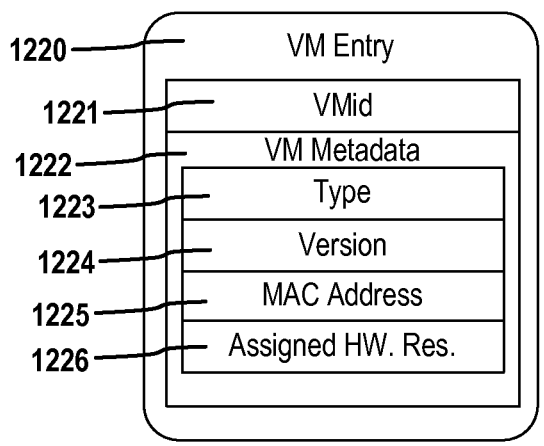

Virtual machine entries (VM entries) 1220 as shown in FIG. 12*c* may be used to identify and describe a virtualized host computer system provided by a hypervisor. A VM entry 1220 may contain but is not limited to a VMid 1221 identifying the virtualized computer system described by the VM entry and corresponding to e.g. a combination of the network address used by the virtualized hardware and the name of the image or configuration defining the virtualized hardware and a VM metadata section 1222 containing data describing the virtualized computer system. The VM metadata section 1222 may contain but is not limited to type 1223 and version 1224 of the operating system installed on the virtualized computer system, data identifying network interfaces of the virtualized computer system like MAC addresses 1225, and data describing the assigned hardware resources 1226 of the virtualized computer system. The data describing the assigned hardware resources may include but is not limited to amount of reserved and maximum CPU resources available for the virtualized system, and amount of available main memory and disk space.

The MAC address of a network interface is a unique identifier physically identifying a specific network interface. In contrast to an IP address, which can be assigned to a specific host dynamically and may change after restart of a computing system, MAC addresses are typically more stable and are not changed during the live time of a computing system. Virtualization systems like hypervisors running multiple virtualized computer systems that have to allow shared and controlled access to physical network interfaces, may create and assign virtualized network interfaces with generated MAC addresses to different virtual computer systems. Those virtual network interfaces are typically backed by and mapped to a physical network interface. The assignment of such virtual network interfaces to virtualized computer systems typical remains unchanged, even after a restart of the virtualized host system or the hypervisor. Also the generated MAC address for a virtual network interface typically remains unchanged. The MAC address of an OS/virtualized computer system is accessible from both the OS/OS agent side and the virtualization infrastructure/virtualization agent side. It may thus be used to correlate topology data describing an OS as provided by the OS agent running on the OS, with virtualization data describing the virtual machine on which the OS is running, as provided by a virtualization agent monitoring the virtual machine. It is contemplated that other properties of the OS/virtualized computer system that identify the OS/virtualized computer system, are relatively stable and accessible for both sides can be used in place of the MAC address to correlate the host computing device with the virtualized computer device.

Figure 13:
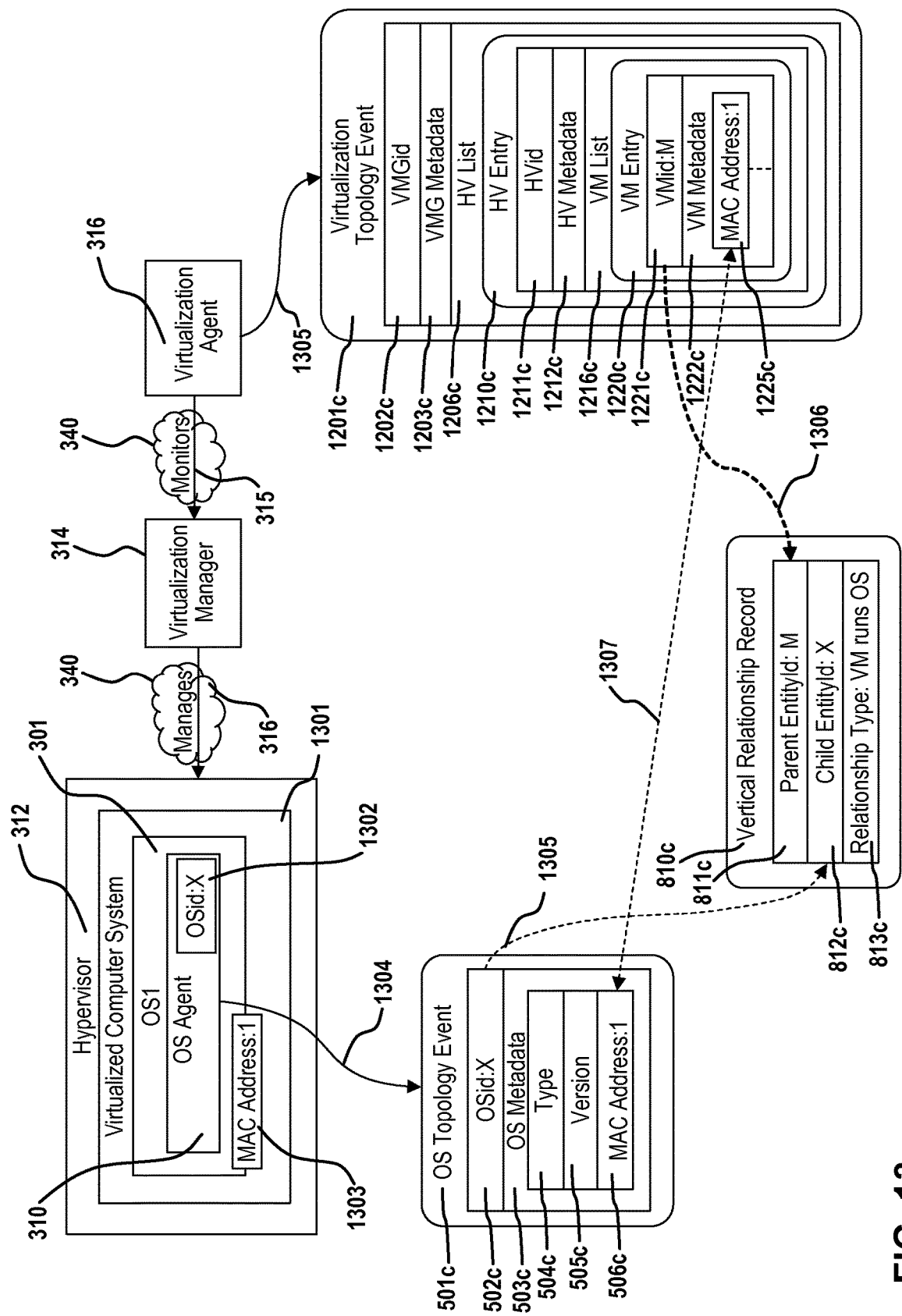

Referring now to FIG. 13 which visually and conceptually describes the correlation of topological data provided by OS agents 310 describing a monitored operating system in form of OS topology events 501 with corresponding virtualization topology events 1201 describing the virtualized computer system that runs the monitored operating system in form of a VM entry 1220.

A hypervisor 312 is managed and monitored 316 by a virtualization manager via a connecting computer network 340. The hypervisor 312 hosts 311 a virtualized computer system 1301 which runs operating system O1 301. The hypervisor 312 assigns a network card (not shown) to the virtualized computer system 1301 with a MAC address 1303. The MAC address has the value "1". The MAC address is accessible and readable form the hypervisor 312 side and from the operating system 301 side. A virtualization agent 316 is installed and configured to monitor 315 the virtualization manager 314 and an OS agent 310 is deployed to operating system OS 1 301. The OS agent 310 queries fingerprint data identifying the operating system and generates a corresponding OSid 1302 with the value "X". The virtualization agent 316 queries topology data from the virtualization manager 314 identifying and describing the hypervisors 312 managed by the virtualization manager 314 and identifying and describing the virtualized computer systems 1301 hosted by the hypervisor 312. The received topology data is reported to a monitoring node 329 in form of a virtualization topology event 1201. The concrete created and sent virtualization topology event 1201*c* contains a VMGid 1202*c* identifying the virtualization manager 314 and VMG metadata 1203*c* describing it. The HV list 1206*c* containing HV entries 1210 describing the hypervisors managed by the virtualization manager and also contains a HV entry 1210*c* describing the hypervisor running the virtualized computer system 1301 executing the operating system OS 1 301 that is monitored by the OS agent 310. The HV entry 1210*c* contains next to a HVid 1211*c* to identify the hypervisor and HV metadata 1212*c* describing it a VM list 1216*c* containing VM entries 1220 describing and identifying the virtualized computer systems hosted by the hypervisor. The VM list 1216c also contains VM entry 1220c describing the virtualized computer system 1301 running the monitored operating system 301. The VM entry 1220c contains a VMid with value "M" 1221c identifying the corresponding virtualized computer system and VM metadata 1222c describing it. The VM metadata 1222c also contains a MAC address entry 1225c indicating that the MAC address of the corresponding virtualized computer system is "1".

The OS agent 310 creates and sends OS topology events 501c identifying and describing the operating system 301 monitored by the OS agent 310. The sent OS topology event 501c contains an OSid 502c set to value "X" to identify the corresponding operating system OS 1 301 and an OS metadata section 503c describing the monitored operating system. Besides other descriptive data like type 504c and version 505c of the monitored operating system, it also contains the MAC address 506c with the value "1". The OS topology event 501c also contains data describing the process groups detected on the operating system. But this data is not relevant for the correlation of OS event with virtualization events and is thus omitted here.

Both OS topology event 501c and virtualization topology event 1201c are received by the monitoring node, which forwards them to the topology processor 331. After creating or updating topological entities reported by the received topology events, like topology entity records representing operating systems, virtualized computer systems, hypervisors and virtualization managers and creating appropriate vertical relationship records 810 describing the relationships between the reported virtualization manager its hypervisors and virtualized computer system, the topology processor analyzes the received OS topology event 501c and virtualization topology event 1201c if a reported virtualized computer system is related to the operating system reported by the OS topology event 501c. The topology processor 331 compares the MAC address 506c of the OS topology event 501c with the MAC addresses 1225 of the VM entries 1220 received with the virtualization topology event 1201c. In case of VM entry 1220c, a match 1307 between the MAC address 506c reported by the OS agent 310 and the MAC address 1225c reported by the virtualization agent 316 is detected. As a consequence, the topology processor 331 creates a vertical relationship record 810c describing that the operating system OS 1 301 is running on the virtualized computer system 1301 reported by the VM entry 1220c. The parent entityId 811c of the created record is set 1306 to the VMid "M" 1221c of VM entry 1220c and the child entityId 812c is set 1305 to the OSid "X" of OS topology event 501c. The type of the vertical relationship 813c is set to a value indicating a virtualized computer system running an operating system.

It is noteworthy that the vertical relationship record 810c connecting the operating system with the virtualized computer system also allows to determine the corresponding hypervisor 317 and virtualization manager 314 for the operating system. As mentioned earlier, the MAC address may in virtualized environments change for some reasons, and in consequence not useable for a reliable identification of operating systems and correlation of OS agent and virtualization agent topology data. To overcome the operating system identification problem, the OS agent may, as mentioned earlier, capture OS fingerprint or identification data for the OS (which may include the MAC address) during installation of the OS agent, and persistently store this fingerprint data in a file on a hard disk of the OS. For further calculation of an OSid, this persisted data is used and not the live data which may potentially change over time. To also overcome the OS agent/virtualization agent data correlation problem, the virtualization agent may also access this fingerprint data file created on installation of the OS agent to create an OSid which may be added to topology data created by the virtualization agent and which may further used to correlate virtualization related topology data with corresponding OS related topology data. Currently available monitoring interfaces provided virtualization infrastructure like virtualization managers do not provide such detailed access to data managed by operating systems running on virtualized hardware due to potential security problems. But from a technical perspective, providing access to such a fingerprint file is solvable, especially as the access from the virtualization side is only a read access which does not manipulate any file system data.

The processes of querying virtualization topology data from virtualization managers and reporting it in form of virtualization topology events 1201 and of processing received virtualization topology events 1201 by the topology processor 331 are shown in FIG. 14.

Figure 14A:
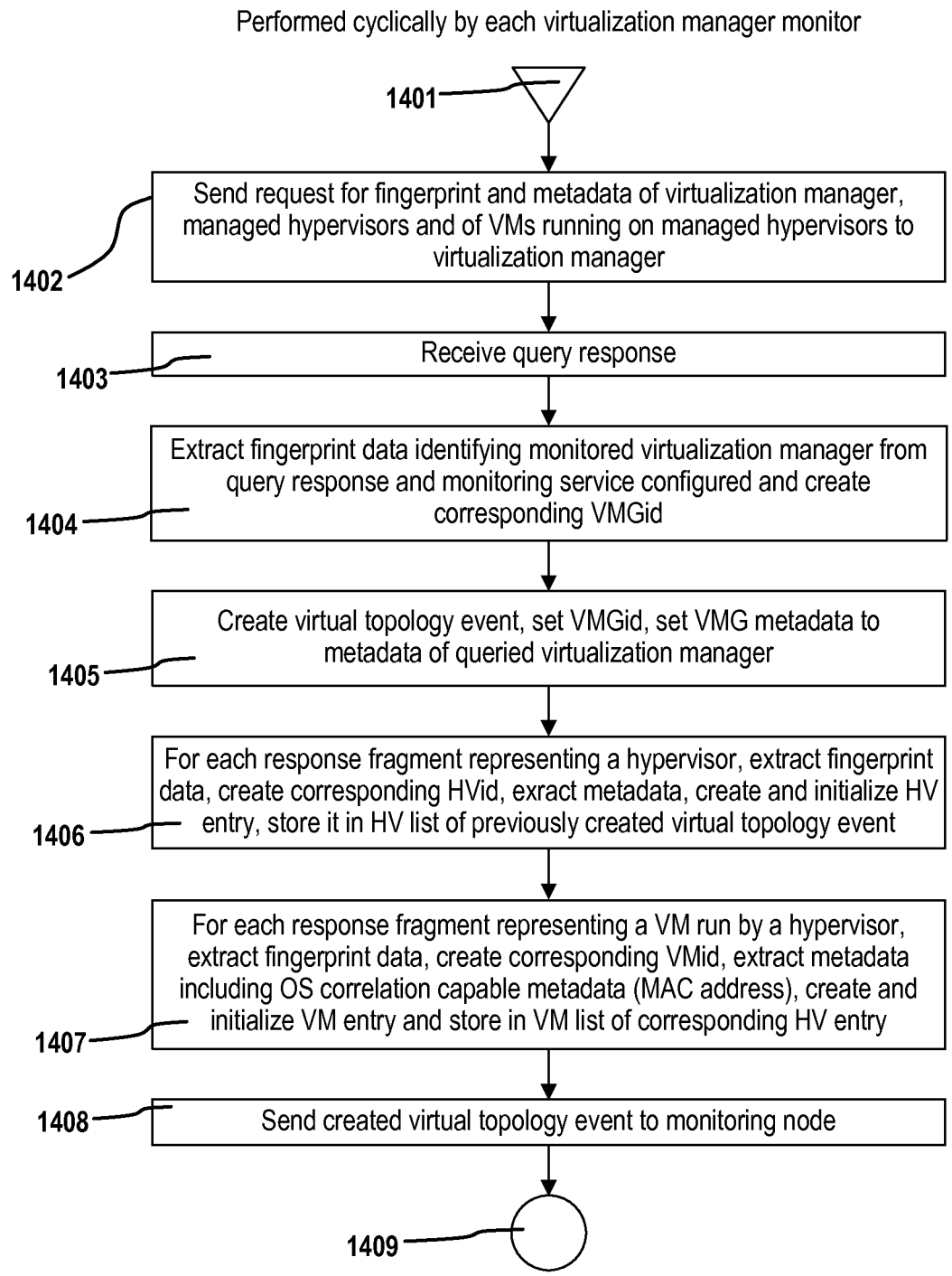

The process of creating and sending of virtualization topology events 1201 as performed by virtualization manager monitors 1101 maintained by virtualization agents 316 is described in FIG. 14a. The process starts with step 1401, when a specific time (e.g. 1 minute or 5 minutes) is elapsed since the last reporting of virtualization topology data. Subsequent step 1402 sends a request for topological relevant data describing the virtualization manager and virtualization components managed by the virtualization manager to the monitoring interface of the virtualization manager. This monitoring interface may e.g. be implemented in form of a Web Service which is accessed by the virtualization manager monitor 1101. The virtualization manager monitor may request data identifying (fingerprint) and describing (metadata) the virtualization manager 314, the hypervisors 312 managed by the virtualization manager and the virtualized computer systems 1301 hosted by the hypervisors 312. Afterwards step 1403 receives the query response and following step 1404 extracts fingerprint data identifying the monitored virtualization manager 314 from query response and monitoring service configuration (e.g. URL of monitoring Web Service of virtualization manager) and creates a corresponding VMGid identifying the virtualization manager. Following step 1405 create a virtualization topology event 1201, extracts metadata describing the virtualization manager from the query response and sets the created VMGid to the VMGid field 1202 and the extracted meta data to the VMG metadata section 1203 of the created virtualization topology event. Afterwards, step 1406 extracts fingerprint data and metadata identifying and describing each hypervisor 312 managed by the virtualization manager, and creates and initializes corresponding HV entries 1210 for each hypervisor by setting the extracted hypervisor describing metadata to the HV metadata section 1212 of the created HV entries and creating a HVid out of extracted hypervisor fingerprint data and setting it to the HVid 1211 of the created HV entries. The created HV entries are inserted into the HV list 1206 of the previously created virtualization topology event 1201.

Following step 1407 extracts for each virtualized computer system reported by the query response, fingerprint data identifying the virtualized computer system, metadata describing it and correlation data allowing to identify the hypervisor hosting it. A corresponding VM entry 1220 is created for each monitored virtualized computer system, the fingerprint data is used to set its VMid 1221, the metadata extracted from the query response to set its metadata section 1222 and the hypervisor correlation data is used to identify the HV entry describing the hypervisor running the virtualized computer system described by the created VM entry. The created VM entries are inserted into the VM list 1216 of the corresponding HV entry 1210. Subsequent step 1408 sends the created virtual topology event 1201 to the monitoring node 329 and the process ends with step 1409. The extracted VM metadata also contains data allowing to identify correlating operating system side topology data, like e.g. a MAC address. The usage of a MAC address to correlate corresponding virtualization and operating system related topology data is only understood as example. Any metadata or fingerprint data identifying a virtualized computer system and an operating system running on the virtualized computer system that is accessible from the operating system and the hypervisor side and that is no subject to frequent changes (e.g. after a restart of hypervisor or virtualized computer system) may be used to identify corresponding operation system and virtualization related topological entities.

Figure 14B:
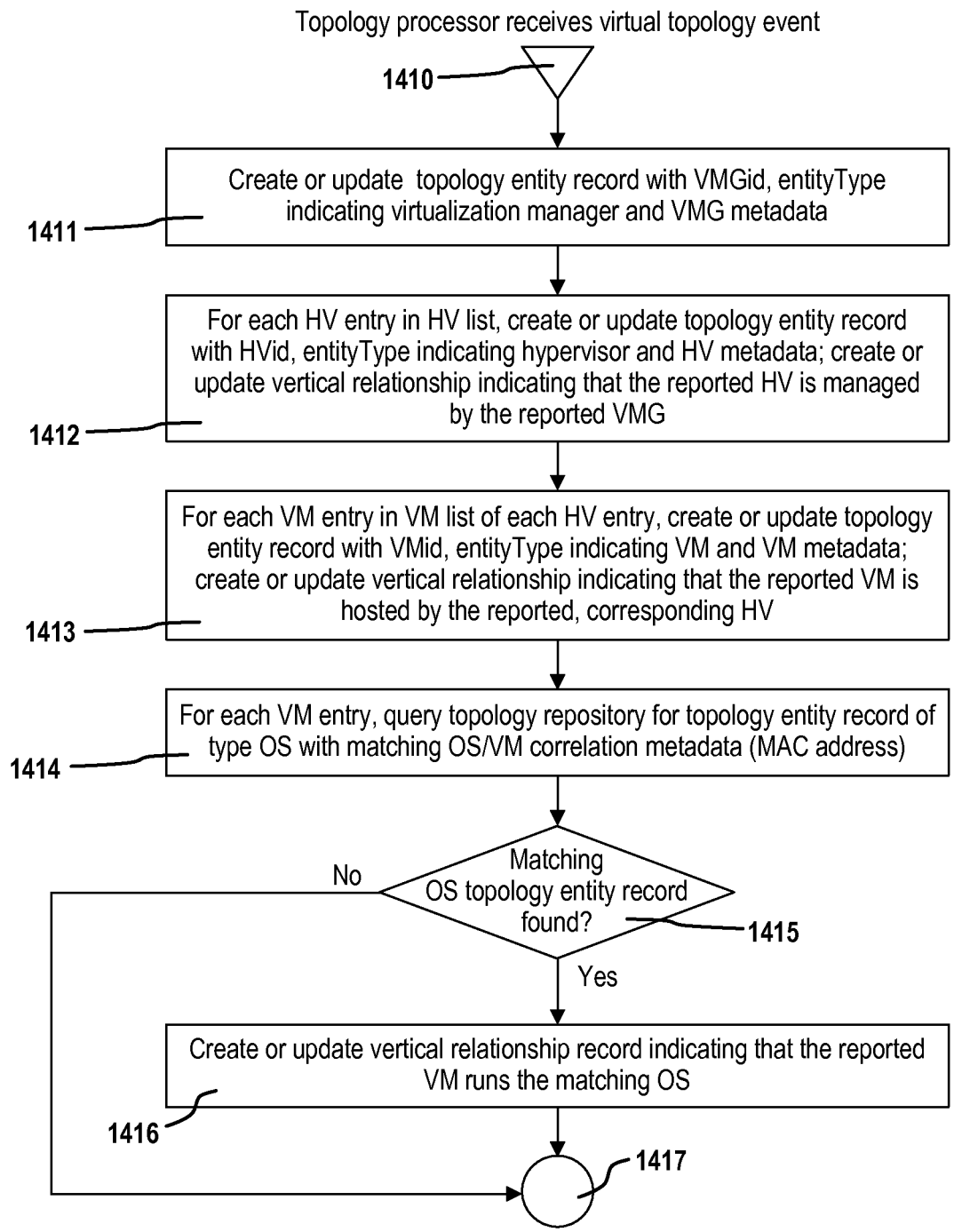

The processing of received virtualization topology events 1201 by the topology processor 331 is described in FIG. 14*b*. The process starts with step 1410, when a virtualization topology event 1201 is received by the topology processor 331. Subsequent step 1411 creates a topology entity record 801 representing the virtualization manager reported by the received event 1201 by setting the entityType 803 to indicate a virtualization manager, the entityId 802 to the VMGid 1202 and the entity metadata 804 to the VMG metadata received with the event 1201. The created topology entity record 801 is inserted into the topology repository 337. In case a corresponding topology entity record 801 (i.e. entityId 802 matching VMGid 1202 and entityType 803 indicating virtualization manager) already exists in the topology repository, no new topology entity record may be created, but the metadata section 804 of the existing one may be updated with VMG metadata 1203 of the received event 1201.

Afterwards, step 1412 creates or updates a topology entity record describing each hypervisor reported by the HV entries 1210 in the HV list 1206 of the received event 1201 (entityId 802 set to HVid 1211, entityType 803 set to indicate hypervisor and entity metadata 804 set or updated to HV metadata 1212) and creates or updates vertical relationship records indicating that the hypervisors are managed by the virtualization manager (parent entityId 811 set to VMGid 1202, child entityId set to HVid 1211 and relationship type 813 set to indicate a hypervisor managed by a virtualization manager).

Following step 1413 creates or updates topology entity records describing each virtualized computer system reported by the VM entries 1220 in the VM lists 1216 of received HV entries 1210 (entityId 802 set to VMid, entityType 803 set to indicate virtualized computer system, entity metadata 804 set or updated to VM metadata 1222) and creates or updates vertical relationship records indicating that the virtualized computer systems are hosted by the respective hypervisor (parent entityId 811 set to HVid 1211 of HV entry 1210 containing the VM entry 1220, child entityId set to VMid 1221 and relationship type 813 set to indicate a virtualized computer system hosted by a hypervisor).

Subsequent step 1414 checks for each created or updated topology entity record 801 representing a virtualized computer system if a corresponding topology entity record 801 representing the operating system running on the virtualized computer system is available. This may e.g. performed by searching the topology repository 337 for topology entity records 801 with entityType indicating an operating system and with entity metadata 804 containing a MAC address matching the MAC address of one of the created or updated topology entity records representing a virtualized computer system. Following decision step 1415 checks for each created or updated topology entity record 801 representing a virtualized computer system if a corresponding topology entity record 801 describing an operating system is available. In case one is available, step 1416 is executed which creates or updates a vertical relationship record 810 indicating that the operating system is running on the virtualized computer system by setting the child entityId 812 to the entityId 802 of the entity record 801 describing the operating system, the parent entity 811 to the entityId 802 of the entity record describing the virtualized computer system and the relationship type to indicate an operating system running on a virtualized computer system. The process then ends with step 1417. In case step 1415 determines that no matching topology entity record representing an operating system is available, step 1416 is omitted. Processing to find matching operating systems and virtualized computer systems may also be performed as part of processing incoming OS topology events 501 by scanning for and linking topology entity events representing virtualized computer systems that have a matching MAC address.

Figure 15:
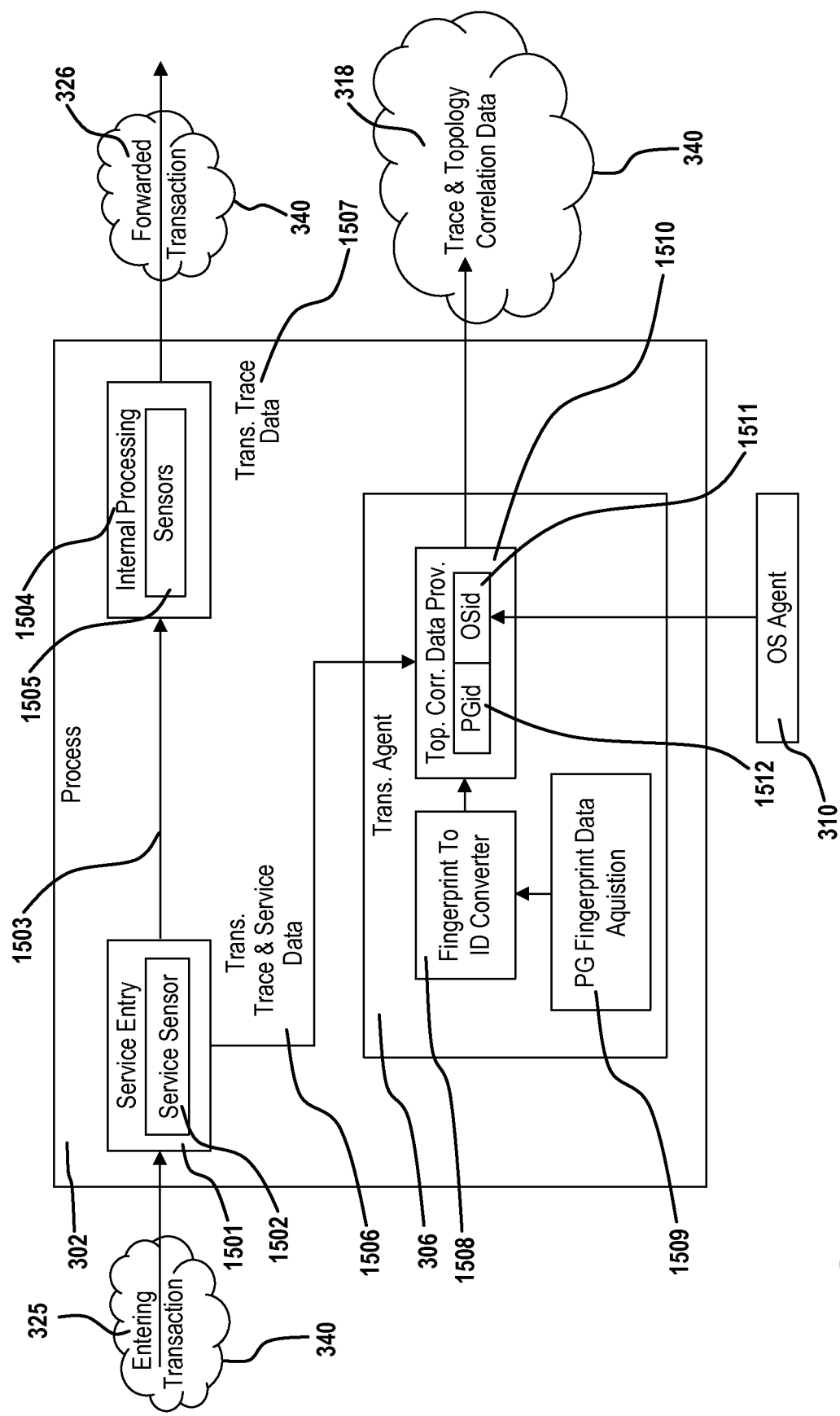

Referring now to FIG. 15, which shows a block diagram of a monitored process 302 with an injected transaction agent 306. The transaction agent 306, together with service sensors 1502 and sensors 1505 is capable to create transaction tracing data that allows to construct end-to-end traces of individual transactions. Transaction agent 306 and sensors 1502 and 1505 operate as described in U.S. Pat. No. 8,234,631.

The injection of transaction agent 306 and sensors 1502 and 1505 into the monitored process 302 may either be performed permanent by manipulating source code of the monitored application and recompiling it, or it may be injected on the fly, during runtime of the monitored application. Runtime injection may be performed using byte-code instrumentation techniques for byte-code executing parts of the monitored application like Java™, .NET or PHP processes as described in U.S. Pat. No. 8,234,631. It may also be performed by manipulating and injecting JavaScript™ code into HTML pages produced by the monitored applications and displayed by web browsers used to interact with the monitored application according to the teachings of U.S. patent application U.S. Ser. No. 13/722,026 "Method And System For Tracing End-To-End Transaction, Including Browser Side Processing And End User Performance Experience" and U.S. Ser. No. 14/056,016 "Method And System For Browser Based, Non-Intrusive Measuring Of End-User Perceived Performance Of Individual Third Party Resource Requests" both by Bernd Greifeneder et al. which are incorporated herein by reference in their entirety.

Sensors may also be implementing by hooking or modifying calls to the runtime environment of the monitored process indicating the execution of monitored methods in case of e.g. PHP or web server processes. Those hooks or modifications may be used to recognize the execution of specific methods, to capture execution context data like method parameters or return values and to send the captured data to a monitoring node 329 as part of trace, service and topology correlation data. Sensors may also provide portions of end-to-end tracing data in cooperation with call-stack sampling technologies as described in U.S. patent application U.S. Ser. No. 13/455,764 "Method and System for Transaction Controlled Sampling of Distributed Heterogeneous Transactions without Source Code Modifications" by Bernd Greifeneder et al. which is incorporated herein by reference in its entirety.

Service entry sensors 1502 are instrumented to service entry methods 1501. A service entry method is a method capable to receive a request from another process. Example for service entry methods are methods that receive HTTP requests, Web Service requests, requests for remote method invocations or methods that receive messages from an external messaging system. Service entry sensors 1502 capture, next to transaction trace and monitoring data that allows to follow individual transactions over thread, process and host computer system boundaries, also service related data that allows to identify and describe the called service. As an example, a service entry sensor 1502 instrumented to a service entry method to handle incoming HTTP requests may capture the URL contained in the incoming HTTP request as service identification and description data. The service entry sensor instrumented to the HTTP request method may in addition provide a service type indicator indicating a HTTP service. The TCP/IP port number and the server name extracted from the URL and the service type indicator may be used to identify the service. The path of the URL may be used to identify specific addressed application components by the HTTP request, and the protocol specified by the URL may be used to determine if it is a secured (protocol HTTPS) request. The captured protocol may be used as descriptive metadata of the detected service and the captured URL path may be used to identify and describe a service method of the identified service. Service methods may be used to further refine the topological description of services and service call relationships.

For a service entry method to handle incoming remote method call requests, a deployed service entry sensor may capture for an incoming request the TCP/IP port used to receive the request and the protocol used to transfer the remote method call request and provide the captured port and protocol and a service type indicator indicating a remote method call service as service identification data. In addition, it may capture the name of the called method and the name of the class providing the called method as data describing a remote method call related service method.

It is noteworthy that data used to identify services and service methods only contains data that is independent from individual transaction executions. It only contains, from transaction execution point of view, static data, identifying components used by monitored transactions, but no data describing the individual transaction itself.

Sensors 1505 deployed to methods that handle internal processing 1504 of the monitored transactions provide tracing data that allows to follow a monitoring transaction over thread, process and host boundaries.

The transaction agent 306 deployed to the monitored process 302 contains a process group fingerprint data acquisition unit 1509 that works synchronous to the process group fingerprint data acquisition unit 524 of the OS agent 310. The fingerprint data extracted by the fingerprint data acquisition unit 1509 of a transaction agent deployed to a specific process is equal to the fingerprint data extracted by the fingerprint data acquisition unit 524 of an OS agent monitoring the same process. The extracted finger print data is forwarded to a fingerprint to id converter 1508 which creates a corresponding numeric process group identifier (PGid) and works synchronous to the fingerprint to id converter 522 of the process monitor. As a consequence, the PGid created by the transaction agent 306 for the process it is deployed to matches the PGid created by the OS agent for the same process. The created PGid is forwarded to and stored by the topology correlation data provider 1510 in a corresponding PGid field 1512. The topology correlation data provider accesses, e.g. at startup of the transaction agent 306, the OS agent 310 and fetches and stores 1511 the OSid identifying the operating system executing the process. Alternatively, the transaction agent 306 may also calculate the OSid synchronous to the OS agent, or it may fetch both OSid and PGid from the OS agent.

In case a transaction enters 325 the process via a service entry method 1501, the service entry sensor 1502 recognizes the entering transaction 325 and creates transaction tracing and service identification data 1506 that allows to trace the monitoring transaction and to identify the service which was used to enter the monitored process 302. The transaction tracing and service identification data is forwarded to the transaction agent 306 and the request received by the process is forwarded 1503 from the service entry method 1501 to components performing the process internal processing 1504 of the transaction. The internal processing may perform a service request to another process which forwards 326 the transaction execution to this other process. If a transaction agent is deployed to this other process, it will create transaction tracing and service identification data that allows determining the called service and to further trace the transaction execution. Sensors 1505 deployed to methods performing process internal transaction execution create transaction trace data 1507 that allows to follow the monitored transaction over thread boundaries. The transaction trace data 1507 is forwarded to the transaction agent 306.

The topology correlation data provider 1510 receives both transaction trace and service data 1506 from service entry sensors 1502 and transaction trace data 1507 from sensors 1505, and enriches the received data with the stored PGid 1512 and OSid 1511 to create trace, service identification and topology correlation data 318 which is sent to a monitoring node 329.

Transaction trace and service data 1506 and transaction trace data 1507 contains data describing the entry and exit of instrumented methods within a thread and contains correlation data to allow the identification of the thread within which the method was executed, data describing the spawning of a thread by a method executed in another thread and contains correlation data that allows the identification of spawning and spawned thread and to reconstruct a parent/child relationship between both threads. It also contains data to identify the process executing the threads and data to identify the host computer executing the process. Transaction trace and service data 1506 may, for data describing the execution of service entry methods, in addition contain data describing and identifying the executed service.

The topology correlation data provider 1510 may add PGid 1512 and OSid 1511 to all transaction trace and service data, only to transaction trace and service data notifying a new thread execution or only to transaction trace data indicating the execution of a service entry method. For a correct correlation of services with the process groups and host computer system it is sufficient to only enrich transaction trace data describing the execution of a service entry method with topology correlation data in form of a PGid and an OSid, but to improve the robustness of the topology monitoring system against lost transaction trace data, PGid and OSid may also redundantly be added to other parts of transaction trace data.

Enriching transaction trace data describing the execution of service entry methods by a process with topology data identifying the process group (i.e. PGid) of the process and the operating system executing the process (i.e. OSid) allows application topology processor 335 and topology processor 331 to correlate and link topological entities describing services with topological entities describing the process groups formed by processes providing those services.

Referring now to FIG. 16, which visually describes the extraction of service related topology data out of transaction trace data and the correlation of service topology data with topology data describing the process groups on which the services are executed.

FIG. 16a shows a fragment of transaction trace data describing a received service call and the process internal handling of the service call. The internal processing triggers the call of another service on another process running on another operating system. FIG. 16c shows corresponding OS topology data as provided by OS agents describing the operating systems and process groups involved in the execution of the transaction fragment and FIG. 16b shows the combination of service related and process group/operating system related topological data into a multidimensional topological model.

A fraction of end-to-end transaction trace data 1601d describing the processing of a monitored transaction within process 1 on operating system OS 1, as created by the transaction processor 330 out of multiple transaction trace, service identification and topology correlation data portions received from the transaction agent deployed to process 1 contains service trace data 1606d describing a service entry point 1602d. The service trace data 1606d may contain but is not limited to a service type 1607d (e.g. HTTP, remote method call), service identification data 1608 (e.g. server and port from URL), service metadata 1609d describing the service (e.g. protocol), and topology correlation data 1610d. The topology correlation data 1610d contains an OSid 1611d and a PGid 1612d identifying operating system OS 1 and the process group of process 1 running on OS 1. Further the trace data describes an internal method execution 1603 with corresponding method trace data 1623 and another internal method execution 1604 with corresponding method trace data 1623, which sends a service request 1605 to a service provided by process 2 running on operating system 2. The corresponding end-to-end trace data 1601e describing the handling of the service call on process 2 also contains service trace data 1606e describing a service entry method 1602e, the service trace data containing service type 1606e, identification 1607e and metadata 1608e to identify and describe the service, and topology correlation data 1610e containing a PGid 1611e and an OSid 1612e to identify corresponding process group and operating system. In addition, it contains trace data 1623 describing method calls 1603 performed by process 2 to handle the service call. The end-to-end transaction trace data fragments 1601d and 1601e are linked 1605 to represent the service call relationship between the first service executed on process 1 and the second service executed on process 2 and called during processing the first service call on process 1.

The data provided by the OS agents 310 deployed to operating systems OS 1 and OS 2 is shown in FIG. 16c. The OS agent deployed to OS 1 sends an OS topology event 501d identifying (OSid 502d) and describing (OS metadata 503d) operating system OS 1 and containing a PG entry 510d in its PG list 507d identifying (PGid 511d) and describing (PG metadata 512d) the process group of process 1.

A similar OS topology event 501e, identifying (OSid 502e) and describing (OS metadata 503e) operating system OS 2 and the process group of process 2 (PGid 511e, PG metadata 512e) is sent by the OS agent deployed to operating system OS 2.

FIG. 16b shows the integrated topological model created by topology processor 337 and application topology processor 335 that illustrates the detected services, their call relationships and their relationships to process groups. The operating system and process group related part of the topological model is provided 1624 by the topology processor 337 and the service and service call related aspects of the topology are provided 1625 by the application topology processor 335.

The topology processor receives OS topology events 501d and 501e and creates 1620d, 1620e topology entity records representing OS 1 1613d and OS 2 1613e. Further it processes the PG entries 510d and 510e and creates 1621d, 1621e corresponding topology entity records representing process group 1 1614d and process group 2 1614e. Further, it created vertical relationship records 810 indicating that process group 1 is running in OS 1 and that process group 2 is running on OS 2.

The application topology processor 335 receives the end-to-end transaction trace fragments 1601d and 1601e and extracts service identification and service metadata to create 1618d, 1618e topology entity records 801 representing service 1 1615d and service 2 1615e. The entityId 802 of the topology entity records may be created by converting service identification data (e.g. server name and TCP/IP port) into a corresponding numeric value. The entityType 803 may be set to indicate a service, and the entity metadata 804 may be set to further describe the service (e.g. service type like "HTTP", secure indicator, server name etc.)

The application topology processor may further extract topology correlation data 1610d and 1610e from the received transaction trace data fragments to create vertical relationships indicating that service 1 1615d is provided by process group 1 1614d and that service 2 1615e is provided by process group 2 1614e. The application topology processor may first use the OSid 1611d, 1611e to identify 1617d, 1617e the topology entity records representing corresponding operating systems OS 1 1613d and OS 2 1613e and afterwards use the PGid 1612d, 1612e to identify 1619d, 1619e corresponding topology entity records representing process group 1 1614d and process group 2 1614e.

Afterwards, the application topology processor 335 analyzes the link 1605 between transaction trace fragment 1601d and 1601e indicating that the service described by service trace data 1606e was called by a method execution 1604 which was performed to process the service described by service trace data 1606d. The application topology processor afterwards creates 1622 a horizontal relationship record 820, sets its client entityId 821 to the entityId 802 identifying service 1 1615d, its server entityId 822 to entityId 802 identifying service 2 1615e and its server port 823 to the port used by service 2 1615e to receive the service request.

Complete end-to-end transaction trace data typically consists in a list or directed tree like structure of linked 1605 trace data fragments like 1601d and 1601e. To algorithmically extract topological data describing service entities and service call relationships out of such end-to-end trace data, the application topology processor may first identify the services addressed in the end-to-end transaction trace data by finding transaction trace data portions describing the execution of service entry points (e.g. 1602d and 1602e).

Those transaction trace data portions may be found by analyzing the trace data and finding trace data portions containing service trace data (e.g. 1606*d* and 1606*e*). Identified service call related transaction trace data portions may be used to create corresponding topological entities describing those services and to link them with the topological entities describing process groups of the processes executing the services.

To determine service call relationships (i.e. which service calls which other service) reported by an end-to-end transaction trace, the application topology processor may for each detected service call analyze the portion of transaction trace data describing the process local handling of the service call to identify outgoing calls (e.g. outgoing call 1605 performed by method execution 1604), determine if trace data fragments describing the processing of the service call (e.g. 1601*e*) are available. In case of such exiting trace data fragments, the application topology processor may determine the corresponding service entry point (e.g. 1602*e*). Afterwards, corresponding topological entities representing called and calling services may be identified and horizontal relationships indicating which service calls which other services may be created.

The analysis of end-to-end transaction data to detect services and service call relationships as performed by the application topology processor may be performed on finished end-to-end transaction trace data created by the transaction processor. It may alternatively also be performed on fragments of not yet finished end-to-end transactions which are still processed and created by the transaction processor. The application topology processor 335 may be notified by the transaction processor 330 as soon as new data indicating a service interaction is available in a currently developing end-to-end transaction trace and may identify and store service topology data that is apparent at this point of time. Such an interlocked transaction trace creation and service topology extraction processing may be used to improve throughput and performance of the topology monitoring system.

Transaction trace data fragments may also describe situations where a nested service call was performed by a service, see e.g. call 1605 of trace data fragment 1601*d*, but the end-to-end transaction trace data contains no corresponding trace data fragment describing the handling of the nested service call, e.g. transaction trace data fragment 1601*e* is missing. This indicates a service call to a process not monitored by a transaction agent 306.

In this case, method trace data describing the request of outgoing service call 1605 available on the client side (i.e. in transaction trace data fragment 1601*d*) may be used to deduce the requested service and the service call relationship. As an example, a request performed by a monitored transaction to interact with a process running a database management system that is not monitored by a transaction agent 306, may contain data identifying the server running the database process and the TCP/IP port used to communicate with the database process, and additional data in the request may be used to identify type and vendor of the database system (e.g. an Oracle™ database system). Host identification name, TCP/IP port and database type may be used to identify a corresponding process group and host or operating system of the called data base service to locate the service within the topological model and to create a topological entity representing the service without the availability of transaction trace data fragments describing the corresponding service call. In addition, a service call relationship may be created from the service execution reported by a transaction agent to the service deducted from the sent request without transaction trace data describing the execution of the request.

Referring now to FIG. 17*a* which shows an exemplary HTTP request URL and explains how parts of the URL may be used as topological relevant service identification and metadata. A HTTP request URL 1701 consists in a protocol definition part 1702, followed by a server identification part 1703, an optional TCP/IP port 1704 and a path 1705 identifying an addressed component or resource on the server. In case the TCP/IP port is missing, a protocol 1702 specific default path is used. The URL may further contain a query string 1706 which may be used as input parameter for the processing performed by the component or resource addressed by server 1703 and path 1705.

On processing an HTTP request URL received with service trace data 1606 to create corresponding topological data, the application topology processor 335 may use protocol 1702, server 1703 and TCP/IP port 80 as service fingerprint data 1714 identifying the service. The same data may also be used as metadata describing the service to form a service topology entity 1716. For creation of service structuring topological entities 1715 further structuring the functionality of the service, like service methods, the application topology processor may use the path 1705 as fingerprint and metadata for a corresponding topology entity. Such a service structuring topology entity could be modelled by a topology entity record 801 with an entityId 802 created and corresponding to the path 1705 of the URL, an entity type 803 indicating a service method and a metadata section containing the path 1705 of the URL. A vertical relationship record 810 may further be created indicating that the service method belongs to a specific service. The query string 1706 which represents the parameters of the service call described by the URL is not used to create topological data.

Topological entities describing service methods may be used to describe a more fine grained service related topological structure.

Returning back to the exemplary trace data fragments and the created corresponding service topology described in FIG. 16, exemplary service trace data 1601*d* describing the first service may contain in an HTTP request URL "http://myHttpServer.com:80/buy.html?item=1" which may be converted in a topological entity identified by server name "myHttpServer.com" and TCP/IP port 80. The path "buy.html" may be used to create topological entity describing the method "buy.html" of the HTTP service with name "myHttpServer.com" and TCP/IP port 80.

The service trace data 1601*e* describing the nested service call may contain data describing a remote method call request directed to a server "myBackendServer" on TCP/IP port 1099, which may be used to create a corresponding service topology entity. In addition it may contain data describing that a method "buy" of a class "PurchaseHandler" was called which may be used to create a corresponding service method topology entity. Next to a horizontal relationship indicating that the HTTP service called the remote method call service as conceptually described earlier, also a horizontal relationship indicating that the HTTP service method "buy" called the remote method call service method "buy" of class "PurchaseHandler" may be created to describe service method call relationships.

The structure of an exemplary command line to start a process running an Oracle Java™ virtual machine which in turn loads and runs an Oracle WebLogic™ application server is shown in FIG. 17*b*. It shows also how the command line is structured and how it may be analyzed by the process monitor 612 of an OS agent 310 to extract process group identification and description data.

The command line 1720 is started by the name of the executable 1721 that is used to execute the process, followed by a set of command line parameters 1724. In case of a process starting a Java™ virtual machine (JVM), the executable name 1721 typically is "java". In case of a JVM, the command line parameters are divided in parameters directed to configuring the JVM, called JVM parameters 1722, and parameters determining the Java byte code executed by the JVM, like the specified java main class 1723. The executed byte code may also be defined by using a "-jar" parameter that points to an executable Java byte code archive. The process group fingerprint data extractor 624 may use the executable name 1721 as first part of process group fingerprint data 1730. The executable name may also be used to determine the type of the process started with the command line and may be used to direct the further analysis of the command line to identify further parts of fingerprint data. In case of a detected java process as indicated by the executable of the command line, the fingerprint data extractor 624 may continue with extracting and analyzing the specified main class 1723 and use it as a second part of fingerprint data. The name of the main class may be analyzed to determine if it correlates to a specific known application server. In case of the exemplary command line, the main class indicates an Oracle WebLogic™ application server. The fingerprint data extractor 624 may use the fact of a detected application server type to continue search for additional, application server specific fingerprint data. In case of the exemplary command line, the JVM parameter "-Dweblogic.Name=Server1" represents application specific fingerprint data for a specific WebLogic™ application server. The detected fingerprint data may be used to create a corresponding PGid identifying the process group. The remaining JVM parameters "-Xmx2G" and "-Dweblogic.home=/home/wlserver/server" may be used, in addition to the other parts of the command line, as metadata describing the process group.

The described structured and stepwise process to extract process group fingerprint data may also, besides the command line, be applied to other process metadata describing a process, like names of components or libraries loaded by the process. It may also be adapted to specific customer environment requirements, by e.g. only considering executable name 1721, or only executable name 1721 and main class 1723 to generate process group fingerprint data.

Figure 18:
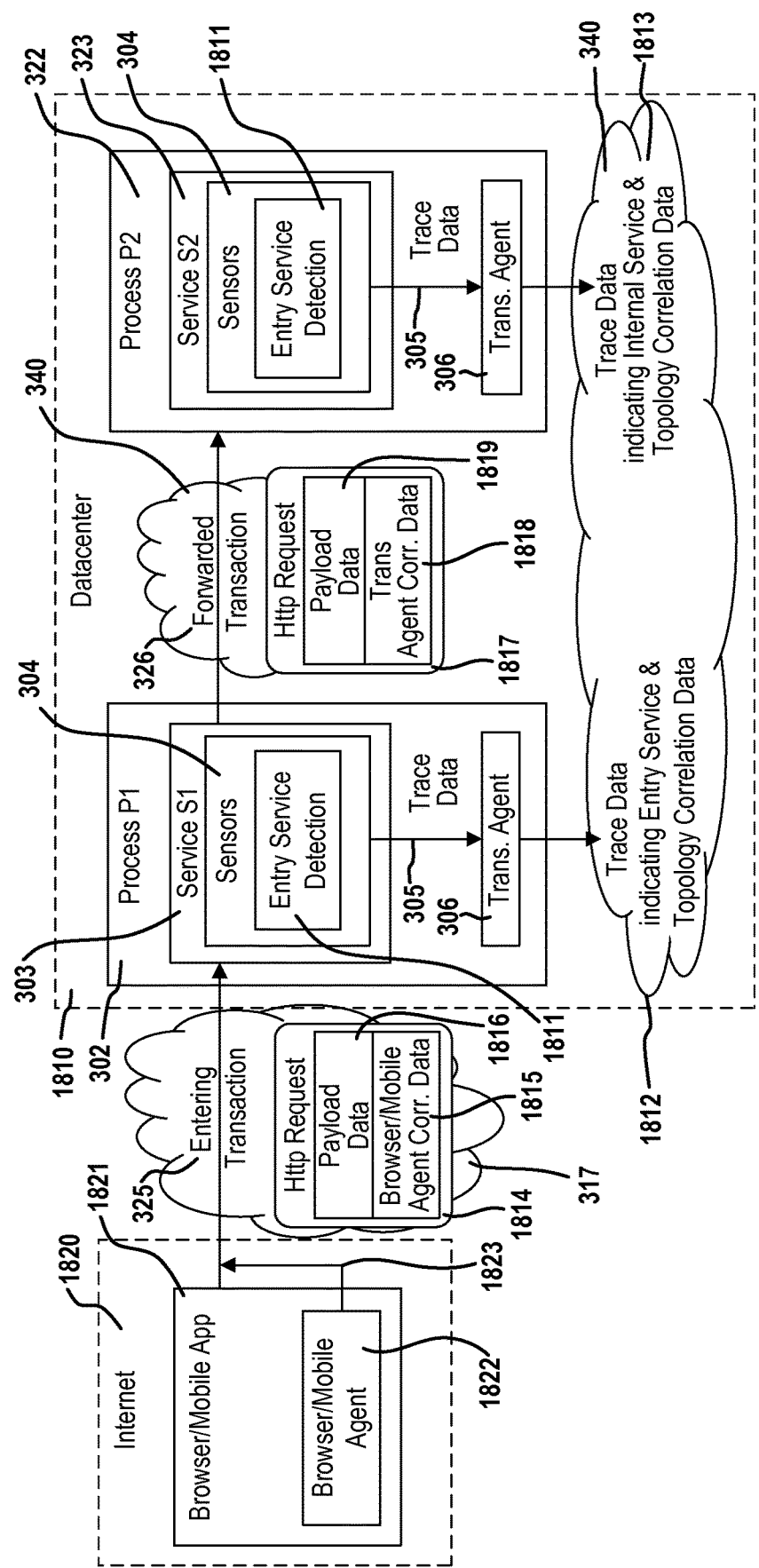
FIG. 18 shows a block diagram illustrating an exemplary method to identify service call requests from outside the monitored data center.

Referring now to FIG. 18, which shows a block diagram of a monitored datacenter 1810, interacting with a monitored browser or mobile application 1821 executed on a device running outside the monitored datacenter 1810, e.g. in the Internet 1820. The monitoring of the browser or mobile application 1822 may be performed according to the teachings of U.S. patent application U.S. Ser. No. 13/722,026, which monitors browser side activities using a browser/mobile app agent 1822 and tags 1815 requests 1814 sent by the browser or mobile application to a service (e.g. service S1 303) of the monitored datacenter 1810. The request tag data 1815 contains correlation data that allows to combine monitored browser side activity with corresponding server or datacenter side transaction executions. The request tag data 1815 may also be used by a topology monitoring system to distinguish service calls originating from outside the datacenter from other service calls. In the example shown in FIG. 18, the entering transaction 325 transfers a HTTP request 1814 containing payload data 1816 and browser/mobile agent correlation data 1815 to service 1 303 executed on process P1 302. The sensors 304 deployed to service S1 also contains an entry service detection unit 1811 which detects if the incoming request contains browser/mobile agent correlation data 1815. In case such correlation data is available, the sensor creates tracing and topology correlation data indicating an entry service 1812. The transaction execution is forwarded 326 to service S2 323 executed by processor P2 322 via another HTTP request 1817 containing payload data 1819 and transaction agent correlation data 1818 (according to teachings of U.S. Pat. No. 8,234,631). The entry service detection 1811 of sensor 304 deployed to service S2 detects that the incoming request contains no browser/mobile agent correlation data 1815 and creates tracing and topology correlation data indicating an internal service call 1813.

The distinction of internal and external service calls may be used to detect services that are accessible from outside the datacenter. Those outside accessible services may be used to define applications 205 according to application detection rules and to group services according to their usage by applications.

In the example described in FIG. 18, the service S1 may e.g. be accessible via a server name "www.myFirstApplication.com", and an application detection rule defining that external accessible services with a server name starting with "www.myFirstApp" belong to an application "myFirstApp". As a consequence, service S1 belongs to application "myFirstApp" because it matches the application detection rule. Also S2 belongs to the application "myFirstApp" because it is called by service S1 that belongs to "myFirstApp".

In case an external accessible service S3 with server name "www.mySecondApplication.com" and an existing application detection rule defining external accessible service name staring with "www.mySecondApp" belong to the application "mySecondApp", and if a transaction entering via S3 would call S2, then service S2 would also belong to application "mySecondApp".

In case a monitored transaction enters the datacenter from outside the monitored data center, origins from a monitored browser, and an application is determined for the service, then the service, and all other services called by the monitored transactions belong to the determined application.

Referring now to FIG. 19 which depicts exemplary queries to the topology model stored in the topology repository 337 to provide data for topology visualizations show in FIGS. 1 and 2.

Figure 19B:
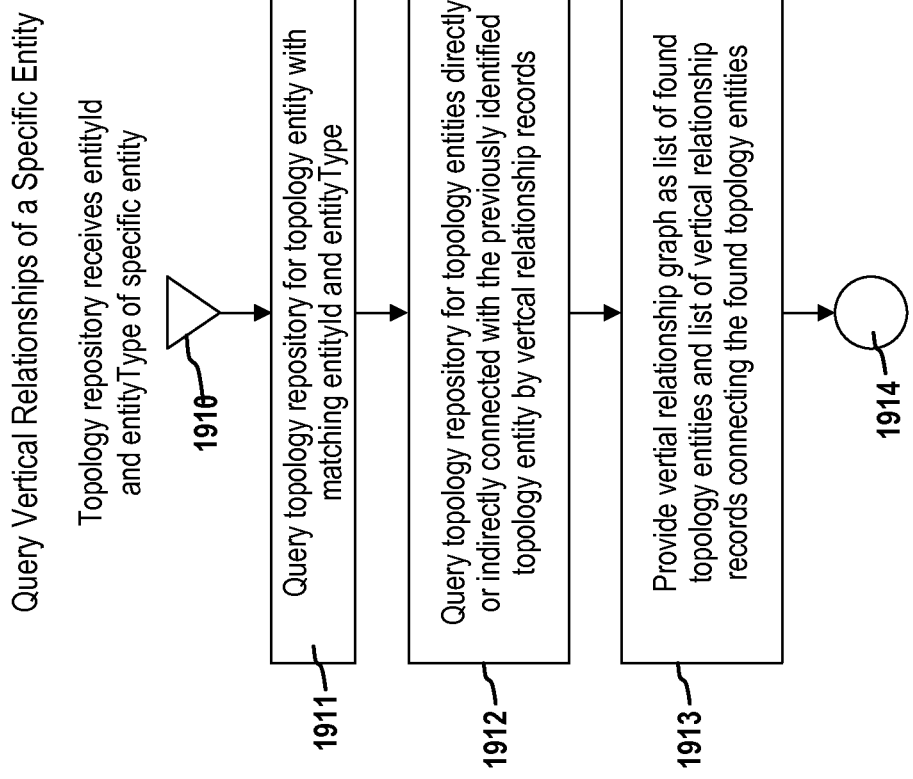
FIGS. 19A and 19B show flowcharts describing exemplary queries performed on the integrated topology model to identify topological relationships between entities of the monitored data center.
Figure 19A:
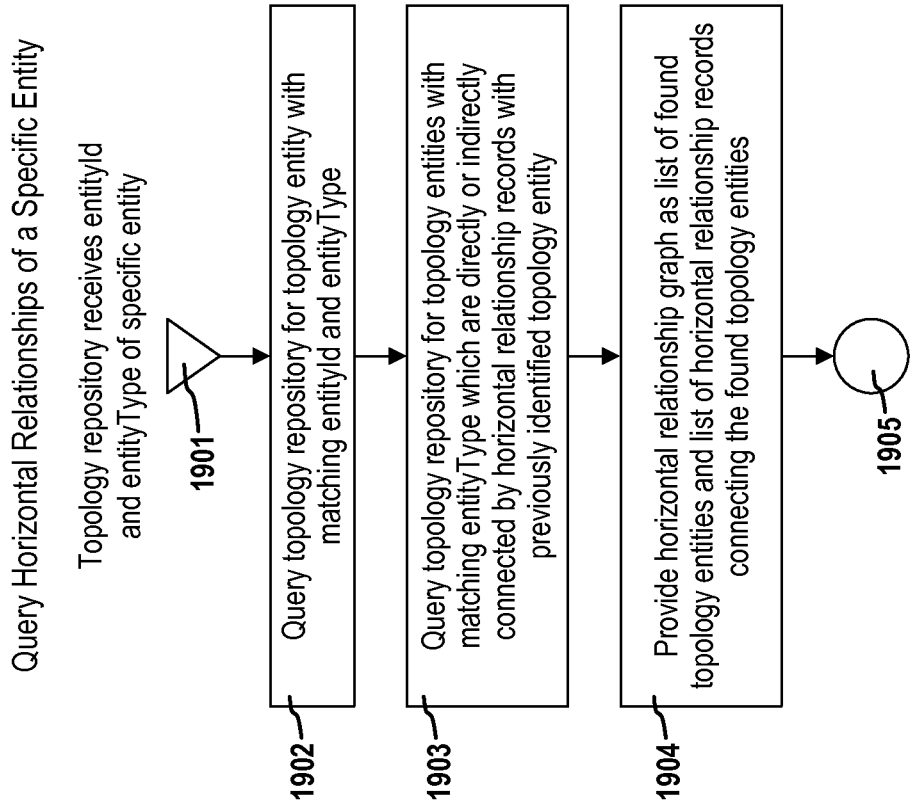

A process to handle an exemplary query request to show the topological relationships of a specific topology entity identified by an entityType and an entityId received with the query is shown in FIG. 19*a*. The process starts with step 1901 when the topology repository 337 receives the corresponding query and continues with step 1902 which queries the topology repository for the topology entity record with matching entityType and entityId. Following step 1903 queries the topology repository for all topological entities with a matching entityType which are directly or indirectly connected via horizontal relationship records to the identified topology entity record.

A query to fetch topology entity records directly or indirectly connected with the topology entity identified by entityId and entityType received with the incoming query may use horizontal relationship records 820 describing connections between topology entity records 801 with the same entityType to recursively determine the topology entity records directly or indirectly (i.e. via intermediate topology entity records) connected to the topology entity identified by the incoming query.

Subsequent step 1904 returns the identified topology entity records and horizontal relationship record representing the horizontal topology graph describing the horizontal relationships of the topology entity record identified by the query. The query result may be used by the analysis and visualization module 339 to provide a visualization of a topology layer as shown in FIG. 1. The process then ends with step 1905.

The processing of a query to determine vertical relationships of a specific entity is shown in FIG. 19*b*. The process starts with step 1910 when the topology repository receives a corresponding request containing a specific entityId and a specific entityType. Subsequent step 1911 queries the corresponding topology entity record and following step 1912 recursively queries for topological entities having a direct or indirect vertical relationship with the identified topological entity and step 1913 returns the list of identified topological entities and vertical relationship records. The returned list may be used by the analysis and visualization module 339 to provide a visualization of vertical relationships of a topology entity as shown in element 203 of FIG. 2. The process then ends with step 1914.

Various other queries of the topological model stored in the topology repository 337 may be performed, to e.g. identify the hypervisors hosting operating systems running a specific process group, find operating system providing a specific service, finding for a specific detected application the hypervisors running operating systems that execute process groups providing services for the detected application.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality. It is understood that grouping of operations within in a given module is not limiting and operations may be shared amongst multiple modules or combined into a single module.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring a distributed transaction by a monitoring system across a distributed computing environment, comprising:

receiving, by a transaction agent, transaction trace data that identifies a transaction being executed in part on a host computing device, where the transaction trace data includes an identifier for a thread executed by a process and the transaction agent is instrumented in the process;

identifying, by a service sensor instrumented in a method executed by the process, a service used by the transaction to enter the process, where the service is executed in the process and the identification of the service occurs in response to the method receiving a request;

receiving, by the transaction agent, service data from the service sensor, where the service data identifies the service used by the transaction to enter the process;

determining, by the transaction agent, identifying information for a process group to which the process belongs and identifying information for an operating system executing on the host computing device and upon which the process is running;

combining, by the transaction agent, the transaction trace data and the service data with the identifying information for the process group and the operating system to form trace and topology correlation data; and sending, by the transaction agent, the trace and topology correlation data over a network to a monitoring node located remotely from the host computing device.

2. The computer-implemented method for claim 1 further comprises receiving the transaction trace data and the service data from the service sensor instrumented in the method, where the method is configured to receive a request from another process.

3. The computer-implemented method of claim 2 further comprises receiving a service request for the service and parsing the service request to determine the service data, where the service request includes a uniform resource locator (URL).

4. The computer-implemented method of claim 3 wherein the service data includes an identifier for a server computer and an identifier for a protocol for accessing the server computer.

5. The computer-implemented method of claim 3 further comprises determining, by a topology processor, a vertical relationship between a method servicing a service request and the service from the service data and creating a record in a topology repository for the vertical relationship, where the topology processor resides on the monitoring node.

6. The computer-implemented method of claim 5 wherein the service is further defined as a remote method invocation (RMI) service, and the method is further defined as a specific remote method which is provided by the RMI service for remote execution.

7. The computer-implemented method of claim 3 further comprises determining, by a topology processor, a vertical relationship between the service used by the transaction to enter the process and the process group to which the process belongs.

8. The computer-implemented method of claim 3 further comprises determining, by a topology processor, a horizontal relationship between the service servicing the service request and another service called by the service from the service data and creating a record in a topology repository for the horizontal relationship, where the topology processor resides on the monitoring node.

9. The computer-implemented method of claim 1 further comprises determining, by an OS agent, metadata for the process and metadata for the operating system, where the OS agent is running on the host computing device;

sending, by the OS agent, an OS topology event over the network to the monitoring node, where the OS topology event includes the metadata for the process and the operating system; and correlating, by a topology processor, the trace and topology correlation data with the metadata for the process and the operating system, where the topology processor resides on the monitoring node.

10. The computer-implemented method of claim 9 further comprises, determining, by the OS agent, metadata for another process, where no transaction agent is injected in the another process.

11. The computer-implemented method of claim 1 wherein the transaction agent interacts with an OS agent to determine the identifying information for a process group to which the process belongs and identifying information for an operating system upon which the process is running, where the OS agent is running on the host computing device.

12. The computer-implemented method of claim 11 further comprises extracting, by the OS agent, identifying information for the process group from at least one of process metadata or from a command which initiates the process.

13. The computer-implemented method of claim 1 wherein processes having the similar functions are mapped to the same process group.

14. The computer-implemented method of claim 1 further comprises determining, by an OS agent, metadata for a given process and metadata for the operating system, where the given process is running on the host computing device and the OS agent is running on the host computing device;

detecting, by the OS agent, a communication with another process running on a second operating system on a second host device, where the given process is participating in the communication; and sending, by the OS agent, a communication topology event over the network to the monitoring node, where the communication topology event includes identifying information for a process group to which the given process belongs, identifying information for the operating system, a network address and port identifier for host computing device and a network address and port identifier for the second host device.

15. The computer-implemented method of claim 14 further comprises receiving, by a topology processor, the communication topology event from the host computing device, where the topology processor resides on the monitoring node;

receiving, by the topology processor, a second communication topology event from the second host device, where the second communication topology event includes identifying information for a second process group to which the another process belongs, identifying information for the second operating system, the network address and port identifier for the host computing device and the network address and port identifier for the second host device;

determining, by the topology processor, a horizontal relationship between the process group of the given process and the second process group of the another process using the communication topology event and the second communication topology event; and creating a record for the horizontal relationship in a topology repository.

16. The computer-implemented method of claim 14 further comprises sending, by the OS agent, an OS topology event over the network to the monitoring node, where the OS topology event includes metadata for the given process and the operating system and where the metadata for the given process includes identifying information for a process group to which the given process belongs;

determining, by a topology processor, a vertical relationship between the operating system and the process group to which the given process belongs using the OS topology event; and creating a record for the vertical relationship in a topology repository.

17. The computer-implemented method of claim 1 further comprises detecting, by a virtualization agent, other host computing devices implemented as virtualized computer systems;

generating, by the virtualization agent, a virtualization topology event for the detected virtualized computer systems, where the virtualization topology event includes an identifier for the virtualized computer system and an identifier for a network interface assigned to the virtualized computer system;

sending, by the virtualization agent, the virtualization topology event over a network to a monitoring node located remotely from the host device;

determining, by an OS agent, identifying information for an operating system running on a particular one of the other host computing devices, wherein the OS agent is running on the operating system;

generating, by the OS agent, an OS topology event, where the OS topology event includes an identifier for the operating system and the identifier for a network interface assigned to the host computing device;

sending, by the OS agent, the OS topology event over the network to the monitoring node; and correlating, by a topology processor, the particular one of the other host computing devices with the virtualized computer system using the identifier for the network interface of the virtualized computer system and the identifier for the network interface assigned to the host computing device, where the topology processor resides on the monitoring node.

18. The computer-implemented method of claim 1 where the identifying information for the process group to which the process belongs contains meta data extracted from the process that remains unchanged after a restart of the process.

19. The computer implemented method of claim 1 wherein a second sensor instrumented into a second method of the processes, wherein the second method is executed by the transaction and the second method sends a service request to another service of another process; and further comprises generating, by the second sensor, transaction trace data for the execution of the second method and for the sending of the service request to the another service of the another process;

determining, by a topology processor, a horizontal relationship between the service servicing the service request and the another service on the another process using the service data and the transaction trace data; and creating, by the topology processor, a record in a topology repository for the horizontal relationship, where the horizontal relationship indicates that the service calls the other service and where the topology processor resides on the monitoring node.

20. A computer-implemented system for monitoring a distributed transaction across a distributed computing environment, comprising:

a transaction agent instrumented in a process executing on a host computing device and executed by a processor of the host computing device, the transaction agent is configured to receive transaction trace data that identifies a transaction being executed in part on the host computing device and the transaction trace data includes an identifier for a thread executing the transaction;

a service sensor instrumented in a method executed by the process, wherein the service sensor operates to identify the service used by the transaction to enter the process and sends service data to the transaction agent, where the service is executed in the process, the service data identifies the service used by the transaction to enter the process, and the identification of the service occurs in response to the method receiving a request; and an OS agent running on the host computing device and executed by the processor of the host computing device, the OS agent determines identifying information for a process group to which the process belongs and identifying information for an operating system executing on the host computing device and upon which the process is running and communicates the identifying information for the process group and identifying information for the operating system to the transaction agent;

wherein the transaction agent combines the transaction trace data and the service data with the identifying information for the process group and the operating system to form trace and topology correlation data, and sends the trace and topology correlation data over a network to a monitoring node located remotely from the host computing device.

21. The computer-implemented system of claim 20 further comprises the service sensor instrumented in the method associated with the service, the service sensor determines the transaction trace data and the service data and sends the transaction trace data and the service data to the transaction agent, wherein the service data includes an identifier for a server computer and an identifier for a protocol for accessing the server computer.

22. The computer-implemented system of claim 21 wherein the OS agent determines metadata for the process and metadata for the operating system and sends an OS topology event over the network to the monitoring node, where the OS topology event includes the metadata for the process, metadata for the operating system and the identifying information for a process group to which the process belongs.

23. The computer-implemented system of claim 22 further comprises a topology processor residing on the monitoring node and configured to receive the trace and topology correlation data, the topology processor determines from the trace and topology correlation data a vertical relationship between a method servicing a service request and the service and creates a record in a topology repository for the vertical relationship.

24. The computer-implemented system of claim 22 further comprises a topology processor residing on the monitoring mode and configured to receive the trace and topology correlation data, the topology processor determines from the trace and topology correlation data a vertical relationship between the service used by the transaction to enter the process and the process group to which the process belongs.

25. The computer-implemented system of claim 22 further comprises a topology processor residing on the monitoring mode and configured to receive the trace and topology correlation data, the topology processor determines from the trace and topology correlation data a horizontal relationship between the service and another service called by the service and creating a record in a topology repository for the horizontal relationship.

26. The computer-implemented system of claim 22 wherein the OS agent determines metadata for the process and metadata for the operating system, detects a communication with another process running on a second operating system on a second host device; and sends a communication topology event over the network to the monitoring node, where the communication topology event includes identifying information for the process group, identifying information for the operating system, a network address and port identifier for host computing device and a network address and port identifier for the second host device.

27. The computer-implemented system of claim 26 further comprises a topology processor residing on the monitoring mode and configured to receive the communication topology event from the host computing device and a second communication topology event from the second host device, where the second communication topology event includes identifying information for a process group to which the another process belongs, identifying information for the second operating system, the network address and port identifier for the host computing device and the network address and port identifier for the second host device, wherein the topology processor determines a horizontal relationship between the process group of the process and the second process group of the another process system using the communication topology event and the second communication topology event; and creates a record for the horizontal relationship in a topology repository.

28. The computer-implemented system of claim 26 further comprises a virtualization agent, the virtualization agent detects host computing devices implemented as virtualized computer systems, generates a virtualization topology event for the detected virtualized computer system, and sends the virtualization topology event over a network to the monitoring node, where the virtualization topology event includes an identifier for the virtualized computer system and an identifier for a network interface assigned to the virtualized computer system.

29. The computer-implemented system of claim 28 wherein the OS agent determines identifying information for an operating system running on the host computing device, generates an OS topology event and sends the OS topology event over the network to the monitoring node, where the OS topology event includes an identifier for the operating system and the identifier for a network interface assigned to the host computing device; and a topology processor receives the OS topology event and identifies a virtualized computer system for the host computing device using the identifier for the network interface, where the topology processor resides on the monitoring mode.

30. A computer-implemented system for monitoring a distributed transaction across a distributed computing environment, comprising:
a virtualization agent deployed on a given host computing device and executed by the processor of the given host computing device, the virtualization agent detects other host computing devices implemented as virtualized computer systems, generates a virtualization topology event for the detected virtualized computer systems, and sends the virtualization topology event over a network to a monitoring node, where the virtualization topology event includes an identifier for the virtualized computer systems and an identifier for a network interface assigned to the virtualized computer systems;
an OS agent running on one of the other host computing devices and executed by the processor of the one of the other host computing device, the OS agent determines identifying information for an operating system running on the one other host computing device, generates an OS topology event and sends the OS topology event over the network to the monitoring node, where the OS topology event includes an identifier for the operating system and the identifier for a network interface assigned to the one of the other host computing device; and
a topology processor residing on the monitoring node, the topology processor configured to receive the virtualization topology event and the OS topology event, and identifies the operating system reported in the OS topology event as being executed on the virtualized computer system in response to a match between the identifier for the network interface in the virtualization topology event and the identifier for the network interface in the OS topology event.

31. The computer-implemented system of claim 30 wherein the virtualization agent determines virtualization infrastructure entities involved in creation of virtualized computer systems, generates data identifying and describing the detected virtualization infrastructure entities and appending the data to the virtualization topology event.

32. The method of claim 30 wherein the identifier for a network address assigned to the virtualized computer systems remains unchanged after a restart of the virtualized computer systems and the identifier for a network address assigned to the one of the other host computing device remains unchanged after a restart of the one of the other host computing device.

* * * * *

UNITED STATES PATENT AND TRADEMARK OFFICE
CERTIFICATE OF CORRECTION

PATENT NO. : 11,159,599 B2
APPLICATION NO. : 14/879183
DATED : October 26, 2021
INVENTOR(S) : Bernd Greifeneder et al.

It is certified that error appears in the above-identified patent and that said Letters Patent is hereby corrected as shown below:

In the Specification

Column 5, Line number 44, please change "FIGS. 16A-6C" to FIGS. 16A-16C.

Signed and Sealed this
Twenty-eighth Day of March, 2023

Katherine Kelly Vidal
*Director of the United States Patent and Trademark Office*